US012730814B1

(12) United States Patent
Miller et al.

(10) Patent No.: US 12,730,814 B1
(45) Date of Patent: Sep. 8, 2026

(54) QUERYING CONTENT STACKS AND GENERATING DYNAMIC CONTENT STACKS IN CLOUD STORAGE ENVIRONMENTS

(71) Applicant: Dropbox, Inc., San Francisco, CA (US)

(72) Inventors: Kyle Miller, Fairfax, CA (US); Christopher Meeks, Austin, TX (US); Theo Richardson, Toronto (CA)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 19/252,724

(22) Filed: Jun. 27, 2025

(51) Int. Cl.
*G06F 16/2455* (2019.01)

(52) U.S. Cl.
CPC ................................ *G06F 16/2455* (2019.01)

(58) Field of Classification Search
CPC .................................................. G06F 16/2455
USPC ........................................................ 707/769
See application file for complete search history.

(56) References Cited

U.S. PATENT DOCUMENTS 5,161,446 A 11/1992 Holbl et al.
5,242,211 A 9/1993 Grad et al.
6,667,475 B1 12/2003 Parran et al.
6,965,894 B2 * 11/2005 Leung ................. G06F 16/2246 707/800
7,631,290 B1 * 12/2009 Reid ......................... G06F 8/38 715/764
7,647,338 B2 * 1/2010 Lazier ................. G06F 3/04817 707/999.102
7,669,199 B2 * 2/2010 Cope ...................... G06Q 10/06 707/790
7,885,981 B2 * 2/2011 Kaufman ............ G06F 16/2423 707/802
7,928,992 B2 * 4/2011 Liu ....................... G06F 40/103 345/592
8,161,081 B2 * 4/2012 Kaufman ............. G06F 16/951 707/802
8,195,686 B2 * 6/2012 Tago ....................... G06F 16/00 707/769
8,386,526 B2 * 2/2013 Shinjo ............... G06F 16/90344 707/706

(Continued)

FOREIGN PATENT DOCUMENTS

EP 3010413 B1 12/2019

*Primary Examiner* — Hanh B Thai
(74) *Attorney, Agent, or Firm* — Keller Preece PLLC

(57) ABSTRACT

The present disclosure relates to systems, non-transitory computer-readable media, and methods for pairing a content management system with a large language model (LLM) to intelligently query groups of related content items. In particular, the disclosed systems can generate content stacks comprising contextually relevant content items. The disclosed systems further utilize an LLM to analyze the content items within the content stack and generate one or more dynamic stack objects (e.g., summaries, timelines, decision logs, or insight views) that synthesize the meaning of content items within a content stack. The disclosed systems can automatically update the dynamic stack objects based on modifications to the content stack. The disclosed systems further generate a content stack data container comprising the content stack and the one or more corresponding dynamic stack objects. The disclosed systems further provide a stack canvas that corresponds to the content stack data container for display to a client device.

20 Claims, 21 Drawing Sheets

(56) References Cited

U.S. PATENT DOCUMENTS 8,595,702 B2 * 11/2013 Maybee .............. G06F 11/3636 717/133
8,812,687 B2 * 8/2014 Das ......................... H04L 67/10 718/1
8,904,352 B2 12/2014 Klein et al.
8,914,417 B2 * 12/2014 Bryan ................... G06F 3/0656 711/132
9,032,895 B2 5/2015 Buck
9,063,892 B1 * 6/2015 Taylor ................. G06F 11/1469
9,619,765 B2 4/2017 Lorentzen et al.
9,621,428 B1 * 4/2017 Lev ......................... H04L 41/12
9,628,847 B2 4/2017 Baker et al.
9,697,258 B2 * 7/2017 Barton ................ G06F 16/9535
10,114,573 B1 * 10/2018 Ellison .................. G06F 9/4493
10,192,523 B2 1/2019 Luomala et al.
10,684,749 B2 * 6/2020 Hu ........................ H04L 65/762
11,637,872 B2 * 4/2023 Amento .................. H04L 65/61 709/226
11,637,896 B1 * 4/2023 Prakashaiah ........ G06F 11/1492 709/223
11,652,883 B2 * 5/2023 Zhang ..................... G06F 16/25 709/220
11,657,147 B1 * 5/2023 Ni ......................... G06F 21/561 726/23
11,734,564 B2 * 8/2023 Jacob .................. G06F 21/6227 707/760
12,015,619 B2 * 6/2024 Subbanna ........... H04L 63/1425
12,184,696 B2 * 12/2024 Subbanna ............... H04L 63/20
12,373,391 B1 * 7/2025 Liao ...................... G06F 16/164
12,373,492 B2 * 7/2025 Mancuso .............. G06F 16/288
2006/0106758 A1 * 5/2006 Chen ..................... G06F 16/284
2008/0283732 A1 11/2008 Rosenkranz et al.
2010/0031162 A1 * 2/2010 Wiser ................... H04N 21/431 715/747
2010/0042597 A1 * 2/2010 Shinjo ............... G06F 16/90344 707/769
2010/0094892 A1 * 4/2010 Bent ................... G06F 16/2471 707/999.005
2010/0192119 A1 * 7/2010 Cope ................... G06F 21/6218 717/100
2010/0333116 A1 * 12/2010 Prahlad ................. G06F 3/0605 713/153
2011/0010386 A1 * 1/2011 Zeinfeld ................ G06Q 10/00 707/769
2011/0191303 A1 * 8/2011 Kaufman .................. G06F 7/00 707/684
2011/0302526 A1 * 12/2011 Thorpe .................. G06Q 10/10 715/788
2012/0331385 A1 * 12/2012 Andreas ............... G11B 27/034 715/716
2013/0031137 A1 * 1/2013 Chen ..................... G06F 16/283 707/E17.005
2013/0238785 A1 * 9/2013 Hawk ................... G06F 9/5072 709/224
2013/0275466 A1 * 10/2013 Xiao ................. G06F 16/90335 707/769
2014/0108474 A1 * 4/2014 David ................... H04L 67/568 707/827
2014/0324913 A1 * 10/2014 Morris .................... G06F 16/23 707/796
2016/0381151 A1 * 12/2016 Apte ..................... H04L 47/821 709/202
2017/0024393 A1 * 1/2017 Choksi .............. G06F 16/24578
2017/0302737 A1 * 10/2017 Piyush ................ H04L 67/1095
2018/0052769 A1 * 2/2018 Bryan ................... G06F 3/0665
2019/0102570 A1 * 4/2019 Broussard ........... G06F 21/6218
2020/0004759 A1 * 1/2020 Brebner .................... G06F 8/10
2020/0076862 A1 * 3/2020 Eliason ............... G06F 3/04897
2020/0312029 A1 * 10/2020 Heinen ................... G06T 7/593
2021/0272372 A1 * 9/2021 Heinen ................... G06T 7/593
2022/0247788 A1 * 8/2022 Subbanna ........... G06F 9/45512
2023/0142055 A1 * 5/2023 Bankston ............ G06F 3/04842 726/6
2024/0273145 A1 * 8/2024 Baek ..................... G06F 16/906
2024/0403341 A1 * 12/2024 Berglund ............ G06F 16/3326
2024/0403366 A1 * 12/2024 Mancuso .............. G06F 16/288
2024/0403551 A1 * 12/2024 Berglund ................ G06F 40/20
2025/0013655 A1 * 1/2025 Mohanty ............... G06F 16/258
2025/0036695 A1 1/2025 De Barros et al.
2025/0094708 A1 * 3/2025 Cunningham .......... G06F 40/30
2025/0147712 A1 * 5/2025 Li ......................... G06F 3/1423
2025/0348271 A1 * 11/2025 Matas ..................... G06F 3/167

* cited by examiner

QUERYING CONTENT STACKS AND GENERATING DYNAMIC CONTENT STACKS IN CLOUD STORAGE ENVIRONMENTS

BACKGROUND

Recent years have seen significant development in generating and storing content across various applications and locations. The advancement of computer applications has allowed users to perform various and/or specialized tasks with certain applications. For example, a user can generate an image with a first computer application and draft a document with a second application. Users routinely produce diverse content types (e.g., documents, spreadsheets, images, chat transcripts, etc.) across multiple applications and storage locations. Furthermore, groups of users often collaborate on projects that span various content formats and repositories. While many existing content management systems have introduced basic mechanisms for managing such content items, existing systems face some technical shortcomings organizing, storing, and accessing contextually relevant content items.

Many existing content management systems are inefficient and inaccurate because they require users to manually drill down through multiple nested levels of folders, links, or interfaces to access individual content items. For instance, existing systems often require users attempting to understand content items within a folder to navigate through separate locations to identify and access distinct content items. In the process of identifying contextually relevant content items, existing systems may expend additional computing resources retrieving and displaying both relevant and irrelevant content items. In many cases, contextually relevant content items, especially those of different content types, are not explicitly linked or grouped. Accordingly, many existing systems require users to locate individual content items and manually infer relationships, which is both inefficient and often results in inaccurate groupings of content items. Thus, many existing content management systems are computationally inefficient and inaccurate because they rely on users to click through multiple pages to identify relevant content items.

Additionally, some conventional systems are inefficient and inaccurate at processing content to generate content insights. To illustrate, some conventional systems that analyze large volumes of content to generate content insights (e.g., summarization, search, or insight extraction) typically process entire datasets to do so. This all-or-nothing approach often results in unnecessary consumption of compute resources, memory, and processing time, especially when a subset of content is typically needed to answer a user query. In high-volume environments, conventional systems typically analyze both relevant and irrelevant data sources, which results in irrelevant outputs.

Conventional content management systems are often inflexible. Some conventional file storage and collaboration systems are restricted to static permission models. To illustrate, many conventional file storage systems rely on private folders accessible only to the owner or shared folders visible to contributing users. These access settings are generally fixed at the folder level. As a result, users must manually manage visibility settings, often duplicating content across private and shared spaces to accommodate different accommodation needs. Moreover, when conventional systems integrate intelligent tools (e.g., search assistants), the intelligent tools often operate under a single visibility scope, limiting their usefulness in mixed-access environments.

SUMMARY

One or more embodiments described herein provide benefits and/or solve one or more problems in the art with systems, methods, and non-transitory computer readable storage media that combine a file storage system with a language learning model to convert semantically relevant content items into stacks. In one or more embodiments, the stack canvas management system can receive a user input to generate a content stack comprising contextually relevant content items, including a particular content item. The stack canvas management system can utilize a large language model to analyze content items within the content stack to generate one or more dynamic stack objects that surface information abstracted from the content items. The stack canvas management system can further provide, for display via the client device, a stack canvas comprising references to content items within the content stack and the dynamic stack objects.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
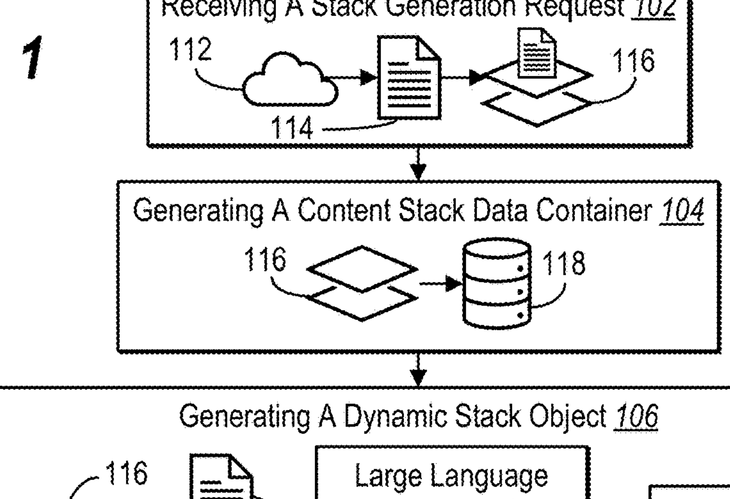
FIG. 1 illustrates an example overview of a stack canvas management system generating and surfacing a stack canvas in accordance with one or more embodiments of the present disclosure.
Figure 1:
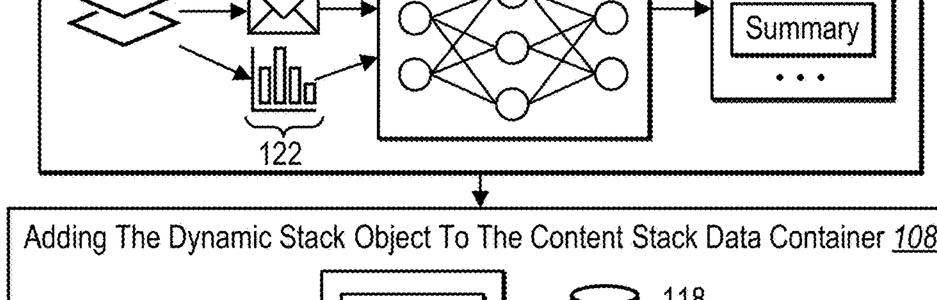
Figure 1:
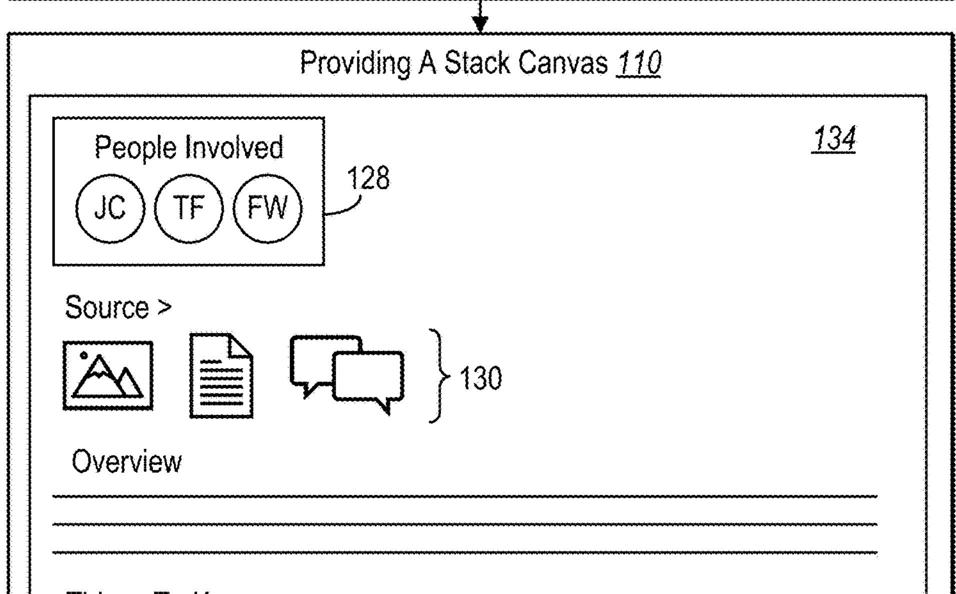

This disclosure describes embodiments of a stack canvas management system that pairs a content management system with a large language model (LLM) to intelligently generate and interact with contextually relevant content stacks of content items. FIG. 1 illustrates an example overview of a stack canvas management system generating and surfacing a stack canvas in accordance with one or more embodiments of the present disclosure.

As shown in FIG. 1, the stack canvas management system 120 (further described in FIG. 13) can perform an act 102 of receiving a stack generation request. The stack canvas management system 120 receives, from a client device associated with a user account, a stack generation request indicating a content item from a cloud storage database to include in a content stack. For example, the stack canvas management system 120 receives an indication to include a content item 114 from a cloud storage database 112 in a content stack 116. The stack canvas management system 120 accesses the cloud storage database 112 to retrieve the content item 114. The cloud storage database 112 stores copies or maintains a connector to a third-party application where the content item 114 is stored. The content item 114 may comprise a content item of any type (e.g., document, video, spreadsheet, image, message session, etc.).

The stack canvas management system 120 can further perform an act 104 of generating a content stack data container. In particular, the stack canvas management system 120 generates, in response to the stack generation request, a content stack data container comprising a reference to the content item from the cloud storage database. As illustrated in FIG. 1, the stack canvas management system 120 generates a content stack data container 118 that stores one or more content items and additional data corresponding to the one or more content items. In some embodiments, the content stack data container 118 enables context-aware grouping of content items. Instead of treating content items as isolated resources, the stack canvas management system 120 utilizes the content stack data container 118 as a dynamic structure that encapsulates related content items to provide a single entry point to all contextually relevant content items.

As further illustrated in FIG. 1, the stack canvas management system 120 performs an act 106 of generating a dynamic stack object. In particular, using a large language model 124, the stack canvas management system 120 generates a dynamic stack object 126 to include within the content stack data container 118. For instance, and as illustrated in FIG. 1, the stack canvas management system 120 analyzes the one or more content items 122 within the content stack 116. The stack canvas management system 120 utilizes the large language model 124 to extract semantic relationships and other contextual metadata from the one or more content items 122. Based on this analysis, the stack canvas management system 120 generates the dynamic stack object 126, which reflects the collective relevance of the one or more content items 122 within the content stack 116. Examples of dynamic stack objects include an overview, summary, decision log, insight list, and others of the one or more content items 122 within the content stack 116. In some embodiments, the stack canvas management system 120 automatically updates dynamic stack objects in response to changes within the content stack 116, enabling real time context-aware synthesis.

As further illustrated in FIG. 1, the stack canvas management system 120 performs the act 108 of adding the dynamic stack object to the content stack data container. As shown in FIG. 1, the stack canvas management system 120 adds the dynamic stack object 126 to the content stack data container 118. As mentioned previously, the content stack data container 118 contains the one or more content items 122 within the content stack 116. By adding the dynamic stack object 126 to the content stack data container 118, the stack canvas management system 120 associates the dynamic stack object 126 with content items within the content stack 116. Accordingly, the stack canvas management system 120 offers users and downstream systems access to enriched, contextualized data about the content items without requiring users to individually access each content item within the content stack 116.

FIG. 1 further illustrates the stack canvas management system 120 performing the act 110 of providing a stack canvas. In particular, the stack canvas management system 120 provides, for display on a client device, a stack canvas 134 corresponding to the content stack data container 118. As shown in FIG. 1, the stack canvas management system 120 provides the stack canvas 134 comprising a visual representation of data within the content stack data container 118. In particular, the stack canvas 134 comprises dynamic stack objects 132 including an overview and things to know about content items within the content stack data container 118. The stack canvas 134 further includes visual representations of content items 130 from the cloud storage database 112 within the content stack 116. As mentioned previously, the content stack data container 118 can include additional data or metadata corresponding to the content items. For instance, the stack canvas 134 also includes a representation of users 128 that are involved with the content items. The stack canvas 134 enables users to explore individual content items via the visual representations of content items 130 while simultaneously viewing synthesized insights via the depicted dynamic stack objects 132.

In some embodiments, the stack canvas 134 further comprises a stack-level chat box. The stack canvas management system 120 receives, via the stack-level chat box, queries related to the content stack data container. For instance, the queries can relate to content items within the content stack and/or dynamic content items represented within the stack canvas. The stack canvas management system 120 utilizes the large language model 124 to process queries received via the stack-level chat box. In some examples, the stack-level chat box can correspond to a private chat function where the conversation is accessible only to the querying user. In other examples, the stack-level chat box corresponds to a group chat function where the conversation is accessible by anyone authorized to view the stack canvas. In some embodiments, the stack canvas management system 120 can toggle between a private chat and a group chat within the same stack canvas.

In some embodiments, the stack canvas management system 120 performs additional optional acts of determining an expiry condition for the content stack data container and archiving the content stack data container based on determining that the expiry condition has been met. Some examples of expiry conditions include when all or a threshold number of associated users are removed, when the content stack data container remains inactive for a defined period (e.g., 60 days), or when the content stack data container reaches a predetermined expiration date set by the stack canvas management system 120 or a user (e.g., project end date or compliance timeline).

Based on determining that the expiry condition has been met, the stack canvas management system 120 performs one or more expiry actions. In some examples, the stack canvas management system 120 automatically archives, restricts access to, or deletes the content stack data container. In some embodiments, the stack canvas management system 120 generates a final snapshot or summary of a content stack data container for record-keeping before the stack canvas management system 120 removes or archives the content stack data container.

As illustrated by the foregoing discussion, the present disclosure utilizes a variety of terms to describe the features and benefits of the stack canvas management system 120. Additional detail is hereafter provided regarding the meaning of these terms as used in this disclosure. For example, as used herein, the term "cloud storage database" refers to a software application system that can be used to create, facilitate, access, and/or manage digital documents across one or more computer networks. In particular, a cloud storage database can provide a centralized platform for managing and organizing digital content, while also facilitating digital content item (e.g., document) management across user accounts. For example, DROPBOX is a cloud storage database that provides many digital content management functions, including file synchronization across devices and between user accounts, real-time editing, commenting, version control, and task assignment. Furthermore, cloud storage databases can import digital content items from third-party systems.

Furthermore, as used herein, the term "third-party system" refers to a computing system that performs one or more function that corresponds to a third-party external to a content management system. For example, a third-party system can enable performing certain tasks such as, but not limited to, photo editing, document creation, financial reporting, medical recording, etc. In one or more embodiments, a third-party system's functionality can be accessed via third-party applications comprising a desktop application, mobile-based operating application, or web-based application.

Additionally, as used herein, the term "digital content item" (or simply "content item") refers to a digital object or a digital file that includes information interpretable by a computing device (e.g., a client device) to present information to a user. A digital content item can include a file or a folder such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is specific to a particular computer application and is accessible via a file system or via a network connection. A digital content item can be editable or otherwise modifiable and can also be sharable from one user account (or client device) to another. In some cases, a digital content item is modifiable by multiple user accounts (or client devices) simultaneously and/or at different times.

As used herein, the term "stack generation request" refers to a request to initiate the generation of a content stack. In particular, a stack generation request indicates at least one content item to include within a content stack. For example, a stack generation request may comprise a user selection of a "create a new stack" user interface element corresponding to a particular content item. In response to receiving a stack generation request, the stack canvas management system 120 can associate the particular content item with a new content stack.

As used herein, the term "content stack" refers to a grouping of one or more content items that are associated based on a criterion. In particular, a content stack refers to a grouping of content items associated based on contextual, semantic, temporal, user-defined, or system-determined criteria. A content stack may include different content types retrieved from different sources. Examples of different content types include documents, spreadsheets, presentations, images, messages, audio files, calendar events, and other content types. Sources of content items within a content stack can include cloud storage platforms, databases, content management systems, and other content item sources.

As used herein, the term "content stack data container" refers to a storage construct that encapsulates a content stack and one or more associated data objects. For example, a content stack data container comprises a content stack and at least one dynamic stack object. Furthermore, in some embodiments, a content stack data container further comprises one or more user-generated content blocks. A content stack data container may include metadata describing the content stack, such as creation parameters, user context, access controls, relevance scores, or semantic relationships. In some embodiments, the content stack data container supports versioning, serialization, export, and sharing. The content stack data container may be further used to enable dynamic rendering within a graphical user interface, such as a stack canvas.

In addition, the term "large language model" (or "LLM") refers to a set of one or more machine learning models trained to perform computer tasks to generate or identify computing code and/or data in response to trigger events (e.g., user account interactions, such as text queries and button selections). In particular, a large language model can be a neural network (e.g., a deep neural network) with many parameters trained on large quantities of data (e.g., unlabeled text) using a particular learning technique (e.g., self-supervised learning). For example, a large language model can include parameters trained to generate or identify computing code and/or data based on various contextual data, including information extracted from webpages, stored content items, and/or from historical user account behavior.

As used herein, the term "dynamic stack object" refers to a data object that represents a synthesized output based on an analysis of one or more content items. In particular, a dynamic stack object refers to a data object comprising a derived output based on one or more content items within a content stack. For example, a dynamic stack object may comprise a summary, overview, insight list, semantic timeline, decision log, or other abstraction derived from content items within a content stack. In some examples, the stack canvas management system 120 generates a dynamic stack object using a large language model (LLM) to process content items within a content stack.

As used herein, the term "stack canvas" refers to a graphical user interface element or visual display configured to represent a content stack data container. In particular, a stack canvas depicts a visual representation of one or more content items within a content stack and associated data corresponding to the content stack. For example, a stack canvas can include visual representations of content items as well as dynamic stack objects corresponding to the content stack. In some examples, a stack canvas further includes an LLM-powered stack-level chat box by which the stack canvas management system 120 receives queries related to the content stack data container.

As indicated above, the stack canvas management system 120 provides several advantages over conventional systems. In particular, the stack canvas management system 120 provides improved computational efficiency and flexibility over existing systems. In particular, the stack canvas management system 120 is more efficient in synthesizing data summaries than conventional systems. In particular, the stack canvas management system 120 generates a dynamic stack object that automatically analyzes content items within a content stack. The dynamic stack object provides an abstracted representation of the underlying content without requiring the user to manually open and review each file. By automatically synthesizing and presenting key context, the stack canvas management system 120 reduces the need for users to click through multiple content items to generate a summary of contents within a file. Furthermore, the stack canvas management system 120 automatically updates dynamic stack objects based on modifications to content stack items and further reduces the number of clicks required for users to identify changes through multiple content items.

Additionally, the stack canvas management system 120 is more efficient and accurate relative to existing content management systems. The stack canvas management system 120 introduces an efficient method for fragmenting content items into semantically meaningful units and processing only content items within those meaningful units when generating or updating dynamic stack objects. In particular, the stack canvas management system 120 can segment content items into content stacks or other units that contain a fraction of content items within a cloud storage database. The stack canvas management system 120 isolates and analyzes just the subset of content items that are relevant to a given query. The stack canvas management system 120 reduces the amount of data fed into an LLM, leading to faster response times and more accurate, query-aligned results.

Additionally, the stack canvas management system 120 is more flexible relative to existing systems. In particular, the stack canvas management system 120 provides a content stack data container that supports flexible, context-sensitive interaction modes. Within the content stack data container, users can initiate a private LLM-powered chat to query content items within a shared content stack without exposing the conversation to others. Alternatively, users can engage in a shared chat where the LLM operates on the shared content stack. This dual-mode configuration allows for both individual insight generation and multi-user interaction without requiring duplication or manual permission switching.

Figure 2:
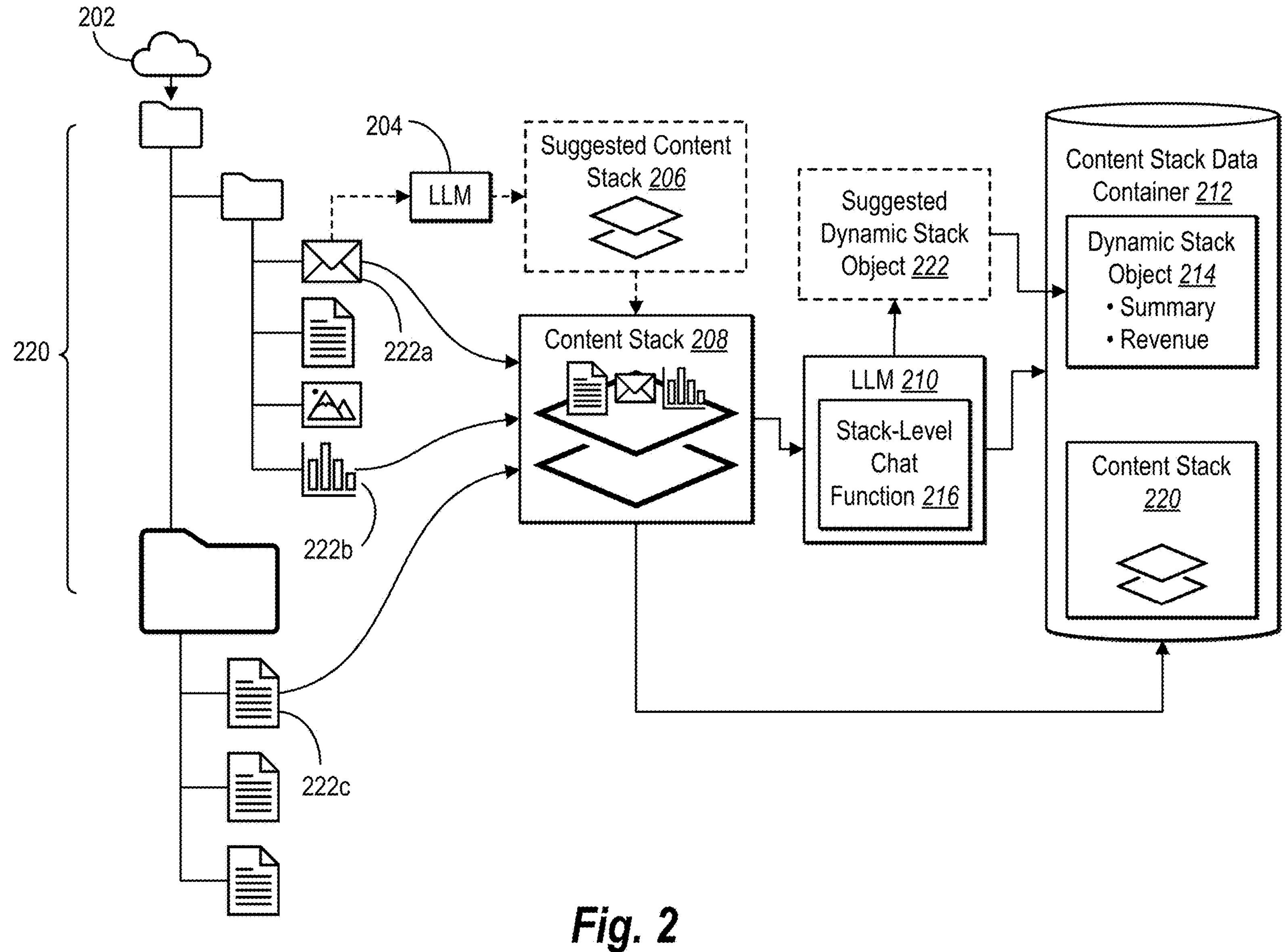
FIG. 2 illustrates the stack canvas management system generating a content stack data container in accordance with one or more embodiments of the present disclosure.

As mentioned, the stack canvas management system 120 can generate content stack data containers comprising content stacks and associated data objects. FIG. 2 illustrates the stack canvas management system 120 generating a content stack data container in accordance with one or more embodiments of the present disclosure.

FIG. 2 illustrates a cloud storage database 202. As mentioned previously, the cloud storage database 202 can store and manage content items originating from a variety of third-party applications. Examples of third-party applications include productivity tools, messaging platforms, collaboration systems, and document repositories. Content items stored within the cloud storage database 202 include files, messages, comments, tasks, images, documents, or other digital artifacts created or accessed through third-party systems. As shown, the cloud storage database 202 can ingest the content items and store the items within a cloud storage layer, which enables centralized access while preserving content item metadata (e.g., source identifiers, timestamps, authorship, access controls, etc.).

As shown in FIG. 2, the cloud storage database 202 employs a storage structure for organizing content items. For example, the cloud storage database 202 stores folders 220. In some embodiments, storage structure organization is dictated by users. For example, a user or an organization can store content items within a tree of folders and subfolders. The organizational structure of content items within the cloud storage database 202 can often fail to reflect the dynamic, contextual relationships between content items important in decision-making Accordingly, the stack canvas management system 120 can utilize content stacks to group content items based on semantic relevance, temporal proximity, user activity, or shared purpose, regardless of their original storage location or format.

FIG. 2 illustrates the stack canvas management system 120 accessing and grouping content items into a content stack 208. As shown in FIG. 2, the stack canvas management system 120 identifies content item **222*a*, content item 222*b*, and content item 222*c* within a cloud storage database 202. As shown, the content items 222*a*-222*c* originate in different storage locations or folders within the cloud storage database 202. In some implementations, the content items 222*a*-222*c* can be added to the content stack 208 at different times. Furthermore, the stack canvas management system 120 can add one or more of the content items 222*a*-222*c* to the content stack 208 from different content stack data containers. For example, the content items 222*a*-222*c*** can comprise content items or dynamic stack objects from other content stack data containers.

As shown in FIG. 2, The stack canvas management system 120 embeds content items within the content stack 208. The stack canvas management system 120 may include either entire content items or portions of content items within the content stack 208. For instance, the stack canvas management system 120 can include an entire content item within the content stack 208 by a direct embedding or through a reference pointer with associated metadata. As shown in FIG. 2, the stack canvas management system 120 includes entire content items **222*a*-222*c* within the content stack 208**.

In some implementations, the stack canvas management system 120 includes only a portion or a fragment of a content item within the content stack 208. For example, the stack canvas management system 120 might determine that a portion of a content item, such as a paragraph, table row, message excerpt, or image annotation, is relevant to a specific query. In some implementations, the stack canvas management system 120 utilizes semantic embedding techniques to extract a portion of a content item to include within the content stack 208. The stack canvas management system 120 can maintain links back to the original content item source to preserve traceability.

As shown in FIG. 2, the stack canvas management system 120 generates a suggested content stack 206. In some implementations, the stack canvas management system 120 utilizes an LLM 204 to generate the suggested content stack 206. In particular, the stack canvas management system 120 can utilize the LLM 204 to process metadata, file contents, and historical interactions to infer which content items within the cloud storage database 202 are semantically relevant. In some embodiments, the stack canvas management system 120 automatically generates one or more suggested content stacks and provides the suggested content stacks for display on a client device. For example, the stack canvas management system 120 utilizes the LLM 204 to process metadata, content item contents, and historical interactions to infer which content items are most relevant. The stack canvas management system 120 can then provide, to the client device, the suggested content stack 206 comprising one or more content items in the cloud storage database 202.

In some embodiments, the stack canvas management system 120 generates the suggested content stack 206 based on user input. For example, in some implementations, the stack canvas management system 120 provides, to the client device, options to manually select content items to include within the content stack 208. In some embodiments, the stack canvas management system 120 can receive, from a client device, a natural language query requesting the creation of a content stack. For example, the stack canvas management system 120 receives a natural language query that indicates a given topic, time frame (e.g., content items from the past two weeks, content items from January 2024), participating users, content types, task context, storage location, or other information.

As mentioned previously, the stack canvas management system 120 utilizes an LLM to analyze content items within a limited content stack as opposed to analyzing content items within an entire cloud storage database 202. By constraining the LLM 210's input to the more focused set of content items within the content stack 208, the stack canvas management system 120 reduces computational overhead, accelerates inference times, and delivers results that are tightly aligned with the user's intent. Furthermore, the limited scope of the content stack 208 ensures that the LLM 210 concentrates on high-signal content and avoids the dilution of insights that often occur when analyzing unrelated data across a large corpus.

Figure 4A:
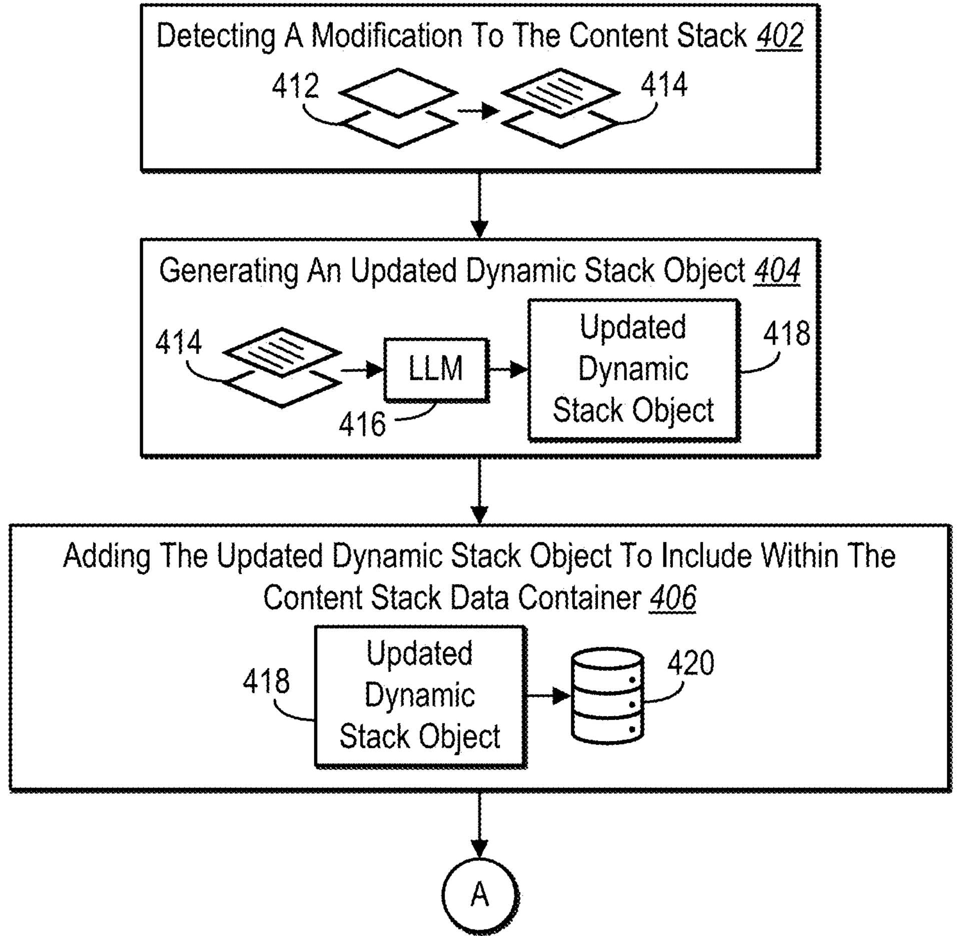
FIGS. 4A-4B illustrate a series of acts by which the stack canvas management system generates an updated dynamic stack object and provides a notification indicating the modification in accordance with one or more implementations.
Figure 4B:
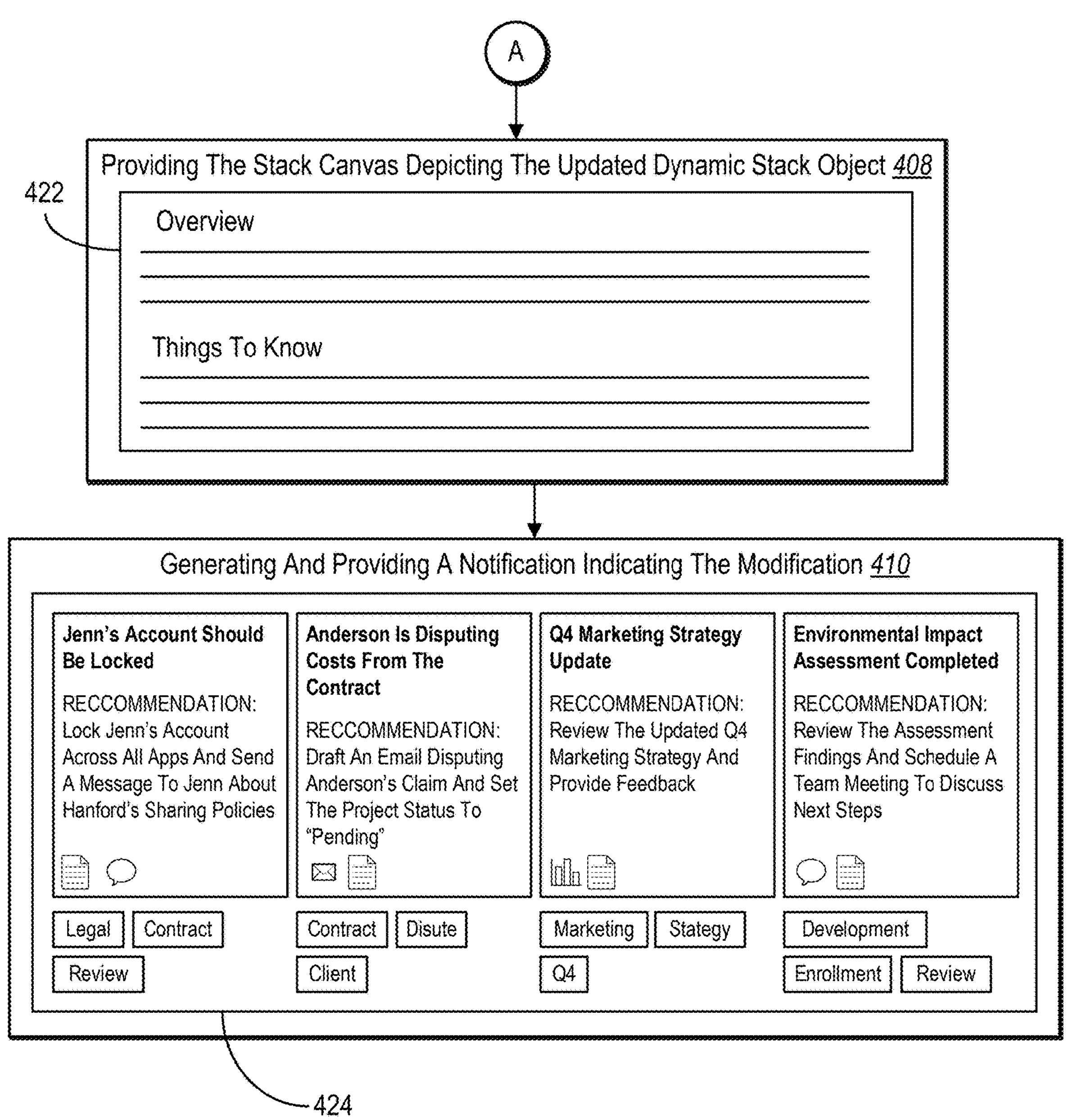

The stack canvas management system 120 utilizes the LLM 210 to automatically update dynamic stack objects based on changes made to the content stack 208. FIGS. 4A-4B further illustrate the stack canvas management system 120 updating dynamic stack objects in response to detected changes to the content stack 208 in accordance with one or more implementations of the present disclosure.

Figure 5:
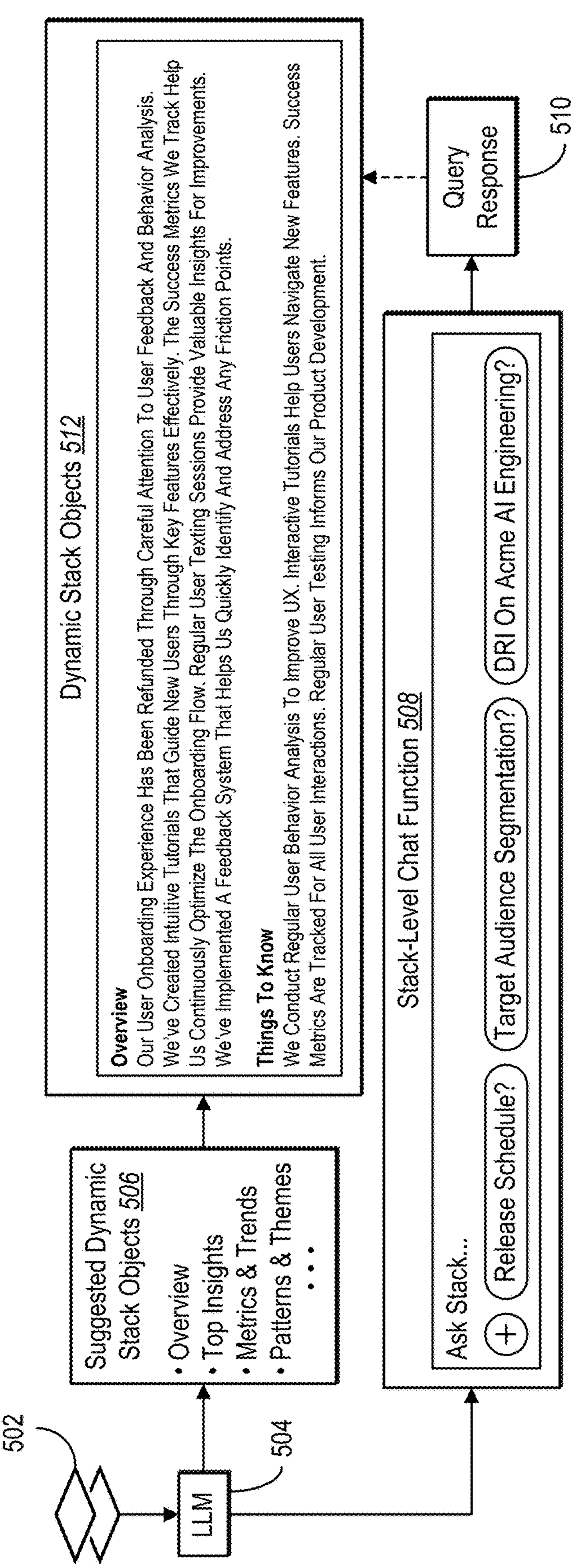
FIG. 5 illustrates the stack canvas management system automatically generating suggested dynamic stack objects and generating query-driven dynamic stack objects in accordance with one or more embodiments of the present disclosure.

As shown in FIG. 2, the stack canvas management system 120 utilizes an LLM 210 to generate a dynamic stack object to include within the content stack data container. In some implementations, the stack canvas management system 120 utilizes the LLM 210 to automatically generate a suggested dynamic stack object 222 based on analysis of the content stack 208. Additionally, or alternatively, the stack canvas management system 120 generates a dynamic stack object 214 based on user input. For instance, the stack canvas management system 120 can generate the dynamic stack object 214 based on a user query received via a stack-level chat function 216. FIG. 5 and the corresponding discussion further detail the stack canvas management system 120 automatically generating suggested dynamic stack objects and generating query-driven dynamic stack objects in accordance with one or more embodiments of the present disclosure.

As further shown in FIG. 2, the stack canvas management system 120 generates the content stack data container 212. The content stack data container 212 encapsulates both the content stack 208 and the dynamic stack object 214. The dynamic stack object 214 comprises a synthesized representation generated by the LLM 210. As shown in FIG. 2, the dynamic stack object 214 may comprise summaries, timelines, action items, or other insights derived from the content stack 208. The content stack data container 212 allows for persistent organization, and consistent display or processing in downstream systems. The content stack data container 212 further enables users and applications to engage with both raw content items from within the content stack 208 and higher-level contextualization through a single interface.

In some embodiments, the content stack data container 212 comprises additional data objects associated with the content stack 220. In particular, the stack canvas management system 120 can include a content block within the content stack data container 212. As used herein, the term "content block" refers to a user-generated data object that is associated with a content stack. In particular, a content block can include text, commentary, highlights, insights, annotations, or references authored by a user. The stack canvas management system 120 can associate a content block with a specific content item or to the content stack 220 as a whole. For instance, the stack canvas management system 120 can display a content block (e.g., a user-generated table, summary, etc.) together with dynamic content items within a stack canvas. In another example, a content block may comprise a user comment on a portion of a content item.

Figure 3:
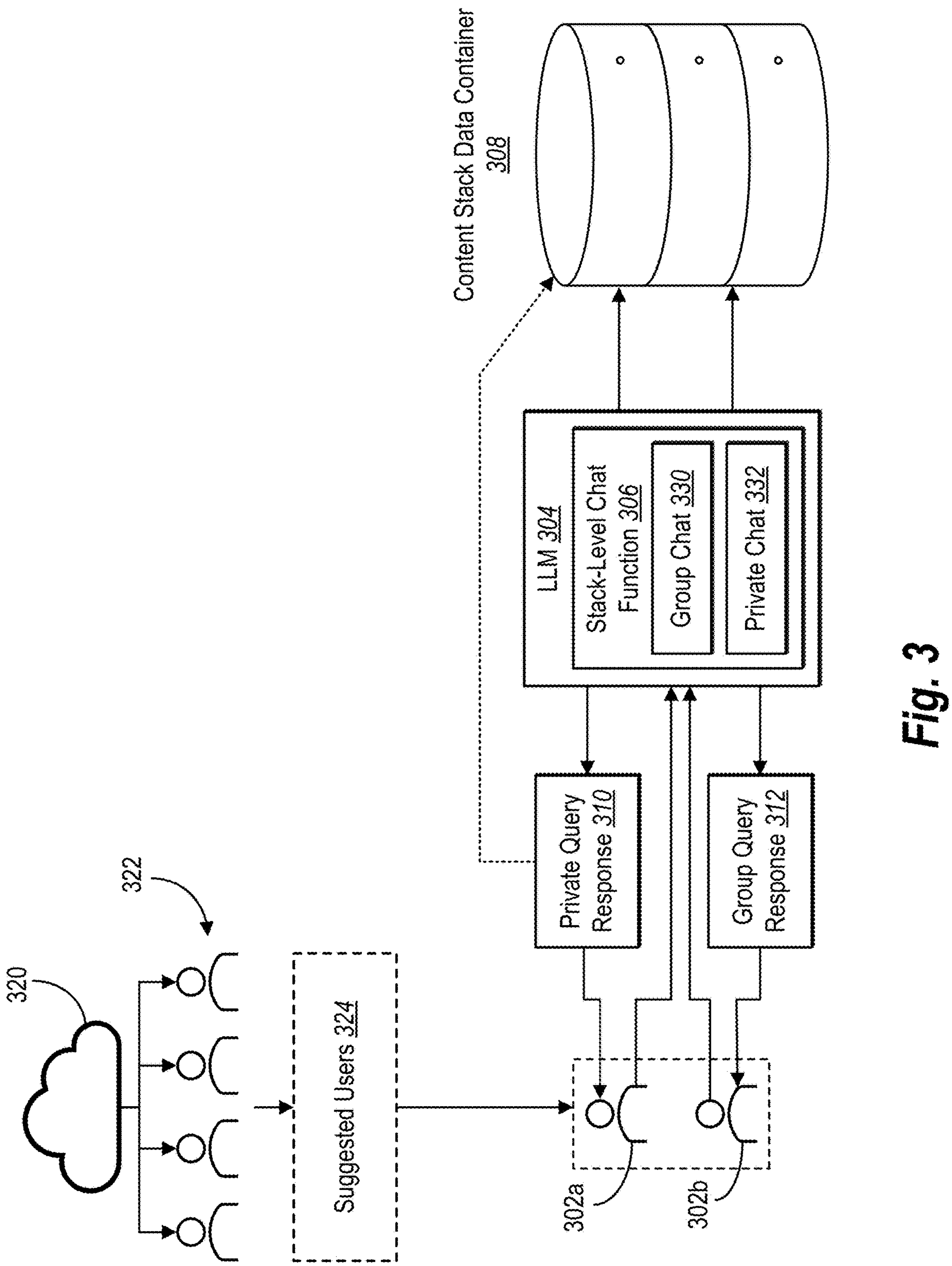
FIG. 3 illustrates the stack canvas management system managing users and both group and private stack-level chat functions in accordance with one or more embodiments of the present disclosure.

In one or more embodiments, the stack canvas management system 120 can associate user accounts with a content stack data container. Furthermore, the stack canvas management system 120 utilizes an LLM to provide a stack-level chat function enabling users to submit queries against a content stack data container. FIG. 3 illustrates the stack canvas management system 120 managing users and both group and private stack-level chat functions in accordance with one or more embodiments of the present disclosure.

FIG. 3 illustrates a user 302*a* and a user 302*b* accessing a content stack data container 308. In some embodiments, the stack canvas management system 120 associates users with the content stack data container 308 based on user input. For instance, if the user 302*a* corresponds with the user account that created the content stack data container 308, the stack canvas management system 120 can receive, from a client device associated with the user 302*a*, a request to add user 302*b* as a contributing user.

In some embodiments, and as illustrated in FIG. 3, the stack canvas management system 120 can generate suggested users 324 from users 322 associated with a cloud storage database 320. As shown in FIG. 3, the users 322 comprise a broad set of users with general access to the cloud storage database 320. For example, the users 322 may comprise individuals across an organization who are authorized to access the cloud storage database 320. Access by the users 322 to the cloud storage database 320 is generally governed by global permissions. The users 322 may interact with content items within the cloud storage database 320, for example, by sharing content items or accessing content items through team-based folders.

As further illustrated in FIG. 3, the stack canvas management system 120 can generate suggested users 324 to include as contributing members to the content stack data container 308. In some embodiments, the stack canvas management system 120 uses an LLM to intelligently generate the suggested users 324. The stack canvas management system 120 can use the LLM to analyze at least one of (i) the content stack central to the content stack data container 308 or (ii) user activity within the cloud storage database 320 to generate the suggested users 324. To illustrate, the stack canvas management system 120 can utilize the LLM to analyze user behavior such as recent file access, patterns, collaboration history, group membership, prior interactions with similar content, and other signals to generate the suggested users 324.

In some embodiments, the stack canvas management system 120 automatically associates the suggested users 324 with the content stack data container 308. In other embodiments, the stack canvas management system 120 provides the suggested users 324, via a client device associated with the user 302*a*. The stack canvas management system 120 can receive a selection of users from the suggested users 324 to grant access to the content stack data container 308.

The stack canvas management system 120 can associate different access controls with users linked to the content stack data container 308. The stack canvas management system 120 enables fine-grained access control for data objects within the content stack data container 308. In one example, the stack canvas management system 120 assigns specific access levels to each user associated with the content stack data container 308. As illustrated in FIG. 3, the stack canvas management system 120 assigns each of the users 302*a*-302*b* one of the following access levels: viewer, commenter, editor, or administrator. The access levels define the extent to which a user can view, modify, or contribute to data objects within the content stack data container 308.

To illustrate, the stack canvas management system 120 assigns the user 302*a* the access level of administrator. Accordingly, the user 302*a* has broad permissions to modify the content stack data container 308 and its included content stack. For instance, the user 302*a* can add or remove content items, dynamic stack objects, users, and other data objects from the content stack data container 308. The stack canvas management system 120 assigns a more limited access level (e.g., commenter) to the user 302*b*. While the user 302*b* can interact with a stack-level chat function 306, add comments to dynamic stack objects and/or content items within the content stack data container 308, the user 302*b* cannot modify the content stack as extensively as can the user 302*a*. In some examples, the stack canvas management system 120 associates even more granular access controls to users. For example, the stack canvas management system 120 can restrict a user from modifying content items within the content stack while allowing the user to modify dynamic stack objects.

In one or more embodiments, the stack canvas management system 120 provides the stack-level chat function 306 to all users with access to the content stack data container 308, regardless of access level. As mentioned, the stack canvas management system 120 provides an LLM-powered chat interface to users accessing the content stack data container 308. As illustrated, the stack canvas management system 120 utilizes an LLM 304 to provide a stack-level chat function 306. Through the stack-level chat function 306, the stack canvas management system 120 can receive natural language queries such as "what are the key decisions in this stack," "summarize the customer feedback," or "show me budgeting documents" from the users 302*a*-302*b*. The stack canvas management system 120 utilizes the LLM 304 to generate responses to user queries. The responses are grounded in the content items contained within the content stack of the content stack data container 308. The stack canvas management system 120 enables the users 302*a*-302*b* to interact conversationally with multi-type data (e.g., documents, messages, spreadsheets, etc.) without requiring the users 302*a*-302*b* to manually browse or access each content item within the content stack data container 308.

In some implementations, the stack-level chat function 306 is part of a global chat function provided by the LLM 304. The stack canvas management system 120 can utilize the LLM 304 to provide a global chat function that the stack canvas management system 120 uses to query a wider corpus of content within the cloud storage database 320 (e.g., content items or content stacks). The global chat function can also query everything and anything across a system where the LLM 304 accesses and synthesizes content from all available sources. In some embodiments, the stack canvas management system 120 provides a global chat function when a user is not viewing a chat canvas. For instance, the stack canvas management system 120 can provide a chat box corresponding to the global chat function when a user is browsing files within the cloud storage database 320.

In some implementations, the stack canvas management system 120 provides options for users to toggle between using the global chat function and the stack-level chat function 306. In some embodiments, the stack canvas management system 120 provides access to the stack-level chat function 306 through the corresponding stack canvas. The stack canvas management system 120 can further provide access to the global chat function through a stack canvas. For instance, the stack canvas management system 120 can provide a toggle option to enable users to switch between using the stack-level chat function and the global chat function.

In some embodiments, the stack canvas management system 120 generates and provides, for display via a client device, a chat history panel that includes chats generated through a stack-level chat function and the global chat function. For instance, the stack canvas management system 120 can provide, within the chat history panel, a list of historical chats. Based on receiving user selection of a historical chat, the stack canvas management system 120 provides, for display, the queries and LLM responses corresponding to the historical chat. The list of historical chats includes both global chats and stack-level chats. The stack canvas management system 120 can indicate which stack canvases are linked with stack-level chats. In some implementations, the stack canvas management system 120 provides options for users to start new stack-level chats or global chats that are disassociated from each other. Furthermore, based on user selection of a historical chat, the stack canvas management system 120 can continue utilizing the LLM 304 to continue the historical chat.

As illustrated in FIG. 3, the stack canvas management system 120 can use the LLM 304 to facilitate both a group chat 330 and a private chat 332 for interacting with the content stack data container 308. In the group chat 330, multiple users with access to the content stack data container 308 can collaboratively engage with the LLM 304 to explore insights derived from the content stack. The stack canvas management system 120 receives a group query and publishes the group query to the group chat 330 accessible by all authorized members of the group. The stack canvas management system 120 utilizes the LLM 304 to process the shared content stack and generates a group query response 312 that is posted to the group chat 330 and visible to all participants. For example, the user 302*b* enters a query into the group chat 330. In response, the stack canvas management system 120 provides the group query response 312 for display within the group chat 330 that is viewable to both the user 302*a* and the user 302*b*.

In some embodiments, and as illustrated in FIG. 3, the stack canvas management system 120 provides a private chat 332. In the private chat 332, an individual user engages directly with the LLM 304 in a one-on-one interface. The stack canvas management system 120 limits the private query response 310 from the LLM 304 to the querying user. For example, the user 302*a* submits a query in a private chat 332. In response, the stack canvas management system 120 posts the private query response 310 to the private chat 332 that is viewable only by the user 302*a*. In some implementations, the stack canvas management system 120 provides, to the user of the private chat 332, an option to publish a private query and the private query response 310 to the group chat 330.

Furthermore, and as shown in FIG. 3, the stack canvas management system 120 can further publish query responses to the content stack data container 308. In particular, the stack canvas management system 120 can receive, from a client device, a request to add a response (e.g., the private query response 310 and/or the group query response 312) to the content stack data container 308. Based on this request, the stack canvas management system 120 can add the response content item to the content stack data container 308. The response content item can become a dynamic stack object that the stack canvas management system 120 updates as the content stack is modified.

As described previously, the stack canvas management system 120 can update dynamic stack objects based on detected modifications to the content stack. FIGS. 4A-4B illustrate the stack canvas management system 120 generating an updated dynamic stack object in accordance with one or more embodiments of the present disclosure. In particular, FIGS. 4A-4B illustrate a series of acts by which the stack canvas management system 120 generates an updated dynamic stack object and provides a notification indicating the modification in accordance with one or more implementations.

As shown in FIG. 4A, the stack canvas management system 120 performs an act 402 of detecting a modification to the content stack. For example, and as shown in FIG. 4A, the stack canvas management system 120 detects a modification to a content item 412. More specifically, the stack canvas management system 120 detects that the content item 412 is modified to an updated content item 414. Modifications to the content stack include modifications to content of individual content items, additions of content items, removal of content items, and/or modifications to users with access to a content stack. Additionally, modifications to the content stack can include reordering or restructuring content items within a content stack, annotating or tagging individual content items (e.g., tags including urgent, or reviewed), modifications to access controls (e.g., granting a user edit access to a content stack), deleting a stack, or merging or splitting stacks.

The stack canvas management system 120 performs the act 402 of detecting a modification to the content stack. In some examples, the stack canvas management system 120 checks for modifications to the content stack at regular intervals. For example, the stack canvas management system 120 can check for modifications on an hourly, daily, weekly, monthly, etc. basis. The stack canvas management system 120 can automatically determine the intervals for monitoring the content stack. Additionally, or alternatively, the stack canvas management system 120 can receive the intervals for monitoring from a user client device. The stack canvas management system 120 periodically scans the content stack. More specifically, the stack canvas management system 120 scans connected content repositories for changes. During each scan, the stack canvas management system 120 compares metadata (e.g., file size, last modified time, version number, etc.) to identify updates. In certain embodiments, the stack canvas management system 120 can perform lightweight content analysis to detect deeper changes.

Additionally, or alternatively, the stack canvas management system 120 can detect modifications to the content stack by receiving updates. To illustrate, the stack canvas management system 120 can integrate that support push-based notifications (e.g., webhooks or change APIs). Accordingly, the stack canvas management system 120 can receive a notification of a modification even directly from a third-party system and automatically update the relevant content stack. Such real-time updates allow the stack canvas management system 120 to maintain responsiveness, especially for collaborative stacks where content changes frequently.

FIG. 4A further illustrates the stack canvas management system 120 performing an act 404 of generating an updated dynamic stack object. As shown, the stack canvas management system 120 utilizes an LLM 416 to analyze the updated content stack comprising the updated content item 414 to generate an updated dynamic stack object. Generally, the stack canvas management system 120 utilizes the LLM 416 to reprocess the updated content stack to regenerate an updated dynamic stack object. The updated dynamic stack object 418 may include a refreshed summary, timeline, decision log, insight view, or other synthesized output.

In some embodiments, instead of reprocessing the entire content stack, the stack canvas management system 120 performs the act 404 by using the LLM 416 to analyze modifications to the content stack. In particular, the stack canvas management system 120 can isolate modifications to the content stack as input deltas. For instance, the stack canvas management system 120 isolates the changes between the content item 412 and the updated content item 414. The stack canvas management system 120 then feeds the input deltas into the LLM 416 along with a reference to the original dynamic stack object. The stack canvas management system 120 uses the LLM 416 to generate an incremental update rather than a complete re-analysis of the content stack. The stack canvas management system 120 can accordingly use input deltas to generate the updated dynamic stack object 418.

FIG. 4A further illustrates the stack canvas management system 120 performing an act 406 of adding the updated dynamic stack object to include within the content stack data container. In particular, the stack canvas management system 120 inserts ore replaces the original dynamic stack object in the content stack data container 420 with the updated dynamic stack object 418. The stack canvas management system 120 can thereby ensure that the content stack data container 420 reflects the most recent version of the content stack.

As illustrated in FIG. 4B, the stack canvas management system 120 performs an act 408 of providing the stack canvas depicting the updated dynamic stack object. As shown, the stack canvas management system 120 updates a stack canvas 422 to depict the updated dynamic stack object reflecting the most recent version of the content stack. For instance, the stack canvas management system 120 presents the updated "Overview" and "Things to Know" dynamic stack objects for display via the stack canvas on the client device.

FIG. 4B further illustrates the stack canvas management system 120 performing an act 410 of generating and providing a notification indicating the modification. As mentioned previously, the stack canvas management system 120 can periodically scan the content stack for modifications at predetermined intervals. Similarly, the stack canvas management system 120 can periodically present notifications at predetermined intervals (e.g., hourly, daily, weekly, monthly, etc.). In some implementations, the stack canvas management system 120 generates and provides notifications automatically based on detecting notifications. In some embodiments, the stack canvas management system 120 provides the notifications 424 indicating modifications to the content stack within the stack canvas. In other implementations, the stack canvas management system 120 provides the notifications 424 as part of a more general cloud storage database interface accessed by the user.

As shown in FIG. 4B, the notifications 424 can comprise different types of information. In some embodiments, the notifications simply indicate changes made to the content stack. For instance, a notification can indicate the user identifier of the user who made the modification and the modification made (e.g., Jenn updated the Q4 marketing strategy). Furthermore, and as illustrated in FIG. 4B, the stack canvas management system 120 generates modification summary notifications. In particular, the stack canvas management system 120 to process modifications to the content stack to generate a modification summary. For instance, the stack canvas management system 120 generates a modification summary that "Anderson is disputing costs from the contract," "Q4 marketing strategy updated," and "Environmental impact assessment completed."

In some embodiments, and as shown in FIG. 4B, the notifications 424 indicate suggested action items. For example, in some implementations, the stack canvas management system 120 utilizes an LLM to process modifications to the content stack to generate a suggested action item. For example, and as illustrated, the stack canvas management system 120 can generate suggested action items including locking Jenn's account. Furthermore, the stack canvas management system 120 can surface suggested action items as "recommendations."

As shown in FIG. 4B, the stack canvas management system 120 can further provide references to content items within the notifications 424. For instance, the stack canvas management system 120 provides icons for display within the notifications 424 that indicate the content item type (e.g., document, message, etc.) that has been modified. In some implementations, the icons comprise links that reference back to the modified content item within the cloud storage database. As further illustrated in FIG. 4B, the stack canvas management system 120 also provides notification tags for display. In particular, notification tags reflect a general context for each of the notifications. Notification tags can indicate certain keywords that signal the context of modified content items. For example, notification tags can include labels such as "legal," "contract," "marketing," "development," and other contextual labels.

Additionally, or alternatively, the stack canvas management system 120 can generate and present approval notifications. In particular, the stack canvas management system 120 can detect proposed modifications by other users accessing a content stack. Based on detecting the proposed modifications, but before modifying the content stack, the stack canvas management system 120 presents approval notifications indicating the proposed modifications to the user. The stack canvas management system 120 receives, from the user's client device, an indication to reject or accept the proposed modifications. Based on receiving an indication to accept a proposed modification, the stack canvas management system 120 modifies the content stack.

As mentioned previously, the stack canvas management system 120 uses an LLM to process content items within a content stack to generate dynamic stack objects. FIG. 5 illustrates the stack canvas management system 120 automatically generating suggested dynamic stack objects and generating query-driven dynamic stack objects in accordance with one or more embodiments of the present disclosure.

As illustrated in FIG. 5, the stack canvas management system 120 applies an LLM 504 to content items within a content stack 502, collectively. Based on the LLM 504's analysis, the stack canvas management system 120 can generate one or more suggested dynamic stack objects 506 that capture information about the content stack 502. In some examples, the stack canvas management system 120 generates the one or more suggested dynamic stack objects 506 based on other commonly used dynamic stack objects. For example, the stack canvas management system 120 determines that users often select "overview," "top insights," and "action items" as dynamic stack objects. Accordingly, the stack canvas management system 120 can preset "overview," "top insights," and "action items" as the one or more suggested dynamic stack objects 506. In some implementations, the stack canvas management system 120 provides the suggested dynamic stack object 506 for display to the client device.

In some embodiments, the stack canvas management system 120 also uses implicit user interactions as input into the LLM 504 to automatically generate suggested dynamic stack objects. For example, the stack canvas management system 120 can analyze implicit user interactions such as hovering over a content item, navigating through related items, or initiating a task view. The stack canvas management system 120 can use the LLM 504 to process the user's implicit actions together with the content items within the content stack 502 to generate a suggested dynamic stack object.

In some implementations, the stack canvas management system 120 automatically generates the dynamic stack object 512 based on suggested dynamic stack objects. For instance, the stack canvas management system 120 can automatically select one or more of the one or more suggested dynamic stack objects 506 to include within the content stack data container. In some embodiments, the stack canvas management system 120 determines the dynamic stack objects 512 based on user input. For example, the stack canvas management system 120 provides the one or more suggested dynamic stack objects 506 for display on the client device. The stack canvas management system 120 can receive, from the client device, a selection of one or more suggested dynamic stack objects to include within the content stack data container. More specifically, the stack canvas management system 120 can determine the dynamic stack objects 512 based on user selection of one or more suggested dynamic stack objects.

Additionally, or alternatively, the stack canvas management system 120 generates the dynamic stack objects 512 based on user input. In some embodiments, the stack canvas management system 120 utilizes the LLM 504 to generate the dynamic stack objects 512 based on a user-submitted natural language query. As shown in FIG. 5, in some embodiments, the stack canvas management system 120 provides for display on the client device, a stack-level chat function 508. The stack canvas management system 120 receives a natural language query via a stack-level chat element associated with the stack-level chat function 508. The natural language query can comprise a request for a summary, status update, decision history, specific insight, or other information. The stack canvas management system 120 utilizes the LLM 504 to process the query received via the stack-level chat element. In some examples, and as illustrated in FIG. 5, the stack canvas management system 120 provides suggested queries (e.g., "Release Schedule?" "Target Audience Segmentation?" "DRI on Acme AI Engineering?") within the stack-level chat element.

The stack canvas management system 120 utilizes the LLM 504 to generate a query response 510. In some implementations, the stack canvas management system 120 can automatically include the query response 510 as one of the dynamic stack objects 512. Additionally, or alternatively, the stack canvas management system 120 includes the query response 510 as a dynamic stack object based on user input. For example, the stack canvas management system 120 receives, from a client device, a request to add the query response 510 to the content stack data container. Based on the request, the stack canvas management system 120 generates a response content item and adds the response content item to the stack data container.

Figure 6:
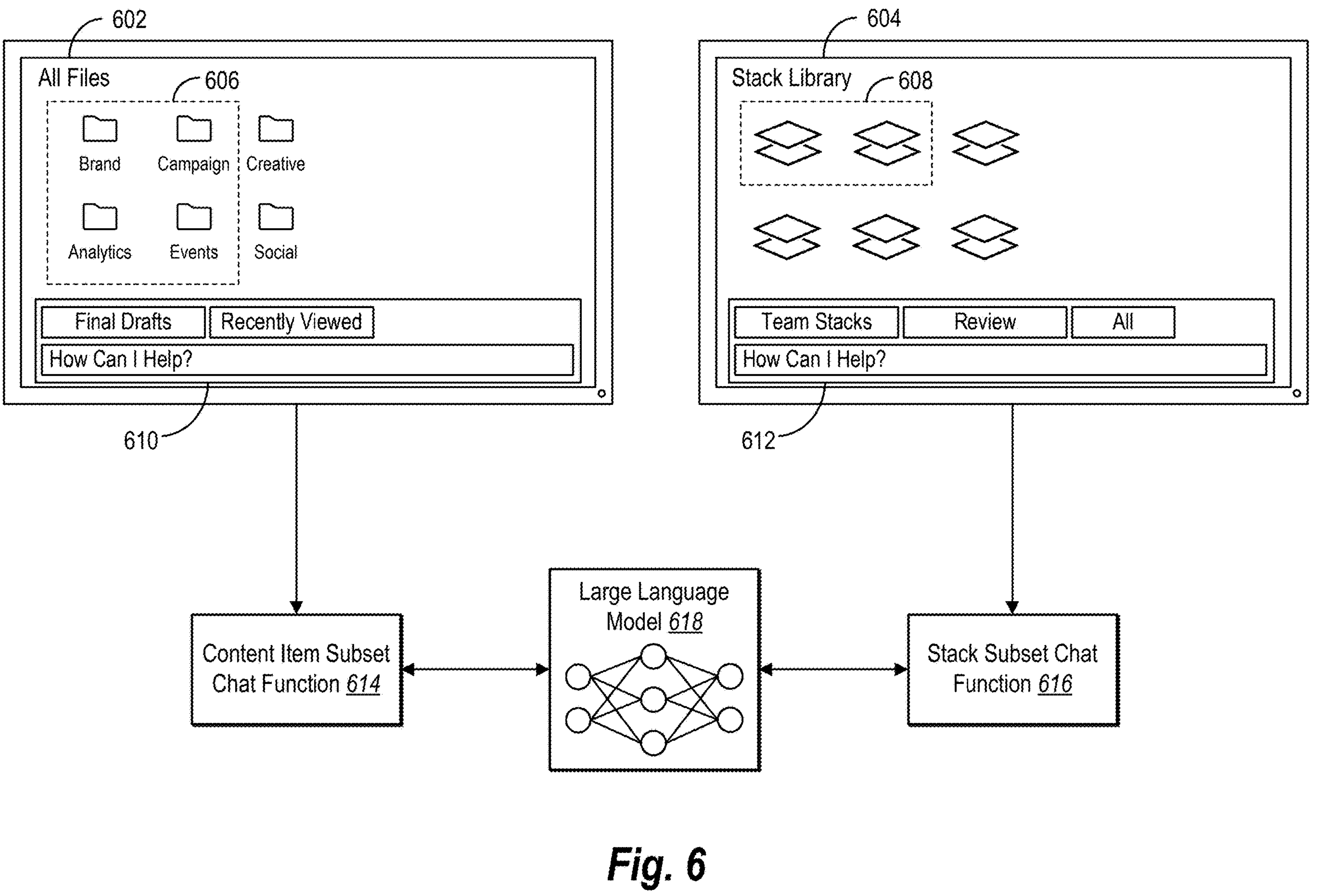
FIG. 6 illustrates the stack canvas management system utilizing an LLM to analyze content at different hierarchical levels in accordance with one or more embodiments of the present disclosure.

In one or more embodiments, the stack canvas management system 120 utilizes an LLM to analyze content at multiple hierarchical levels for both content items and content stack data containers. FIG. 6 illustrates the stack canvas management system 120 utilizing an LLM to analyze content at different hierarchical levels in accordance with one or more embodiments of the present disclosure. Generally, the stack canvas management system 120 can utilize a large language model 618 to provide a content item subset chat function 614 for analyzing content items within a cloud storage database and a stack subset chat function 616 for analyzing content stack data containers within a stack library.

Generally, and as mentioned previously, the stack canvas management system 120 can improve efficiency and accuracy by limiting the number of content items ingested for analysis by the large language model 618. Instead of processing an entire corpus of content items within a cloud storage database, the large language model 618 processes a select subset of content items to generate a more targeted response. In some embodiments, the stack canvas management system 120 utilizes a hierarchy-aware system to control the subset of content items analyzed by the large language model 618.

As shown in FIG. 6, the stack canvas management system 120 can control a subset of content items analyzed by the large language model 618 based on user input in a file storage user interface 602 and a stack library interface 604. The stack canvas management system 120 determines a hierarchical level of user interest and analyzes a subset of content items within the hierarchical level using the large language model 618. The file storage user interface 602 displays a hierarchical folder system of content items stored within the cloud storage database. In some implementations, the folder system displayed in the file storage user interface 602 has not been organized into content stacks. In contrast, the stack library interface 604 displays several content stacks comprising content items previously sorted into the content stacks.

The stack canvas management system 120 can determine a hierarchical level of interest based on explicit user input. In particular, the stack canvas management system 120 can receive a selection of content items to analyze using the large language model 618. For example, the stack canvas management system 120 receives a user selection of folders 606 within the file storage user interface 602. The stack canvas management system 120 further receives, through a LLM chat element 610, a query for the large language model 618. The stack canvas management system 120 uses the large language model 618 to analyze content items associated with the folders 606 based on the user query. Similarly, the stack canvas management system 120 receives a user selection of content stacks 608 and a user query through a LLM chat element 612. The stack canvas management system 120 uses the large language model 618 to analyze content items within the selected content stacks 608 and based on the user query.

In some examples, the stack canvas management system 120 defines the scope of content items or content stacks analyzed by an LLM by using scope tags. For instance, the stack canvas management system 120 provides various scope tags and receives a selection of scope tag. In one embodiment, the stack canvas management system 120 provides scope tags within the LLM chat element 610 and the LLM chat element 612. Scope tags can be activity-based (e.g., recent activity, opened this week, commented on), organizational (e.g., team folders, department files, etc.), content type (e.g., documents only, slides, design files, etc.), workflow (e.g., awaiting feedback, final versions, drafts, etc.), query context (e.g., related to query, low confidence, etc.). The stack canvas management system 120 can use other scope tags to define the scope of analyzed content items.

The stack canvas management system 120 also infers a hierarchical level of interest based on implicit user input. The stack canvas management system 120 can infer the hierarchical level of interest based on user actions. Generally, users browse content items in a visual way, for example, by clicking into folders to achieve a more granular view of content items. Users may also "zoom out" to view content items from a group of folders. In some embodiments, the stack canvas management system 120 is screen aware and can infer that a user is interested in content items present in folders or stacks presented on a screen at a given point in time. For example, based on receiving a user query via the LLM chat element 610, the stack canvas management system 120 can analyze content items associated with files displayed within the file storage user interface 602. Similarly, based on receiving a user query via the LLM chat element 612, the stack canvas management system 120 can analyze content items associated with content stacks displayed within the stack library interface 604. The stack canvas management system 120 can infer a hierarchical level of intent using other user actions, such as previewing content items, spending time viewing content items in a file or stack canvas, clicking linked files, bookmarking content, or commenting on content items.

Figure 8A:
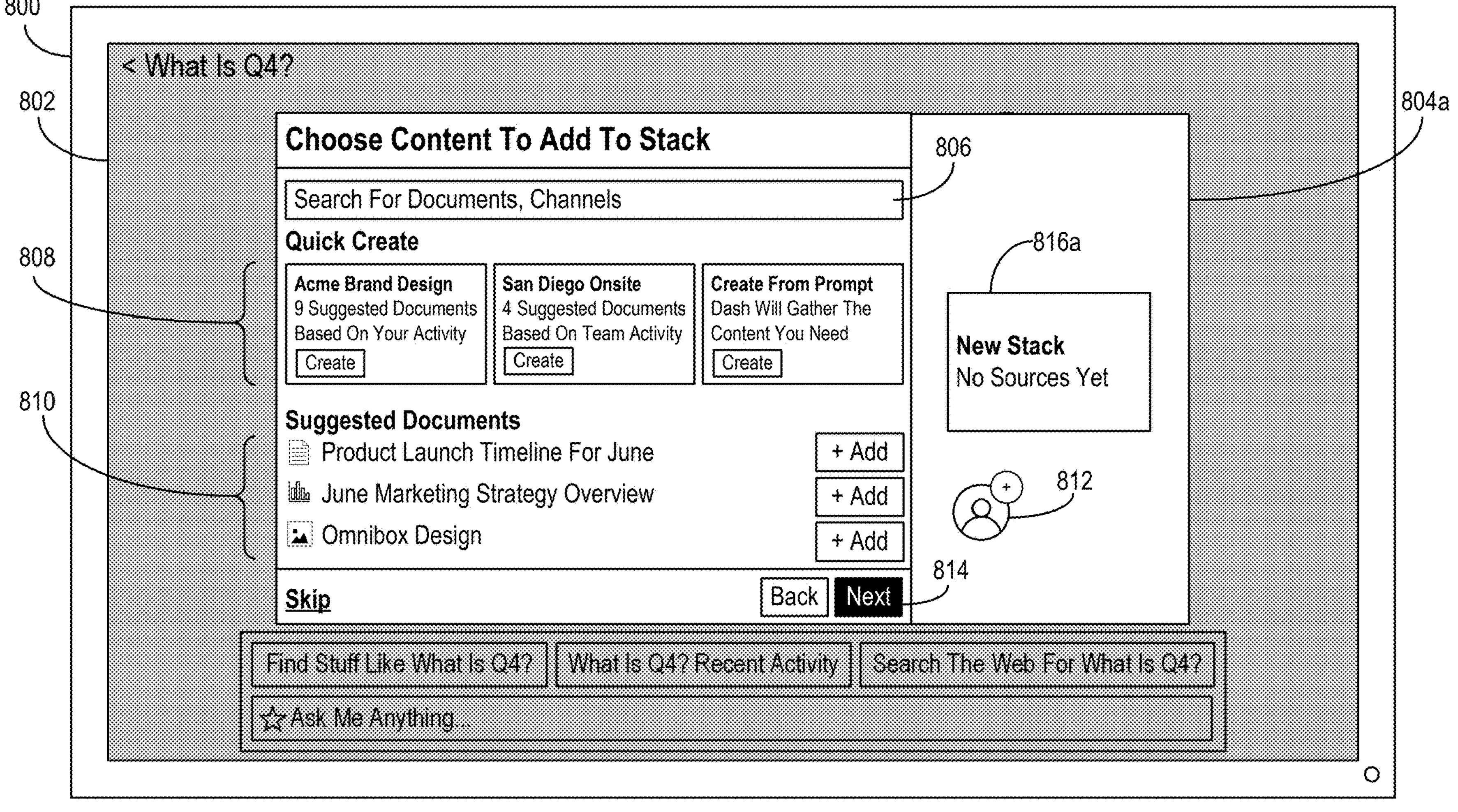
FIGS. 8A-8C illustrate a series of assisted stack creation user interfaces for manually creating a content stack data container in accordance with one or more embodiments.
Figure 8B:
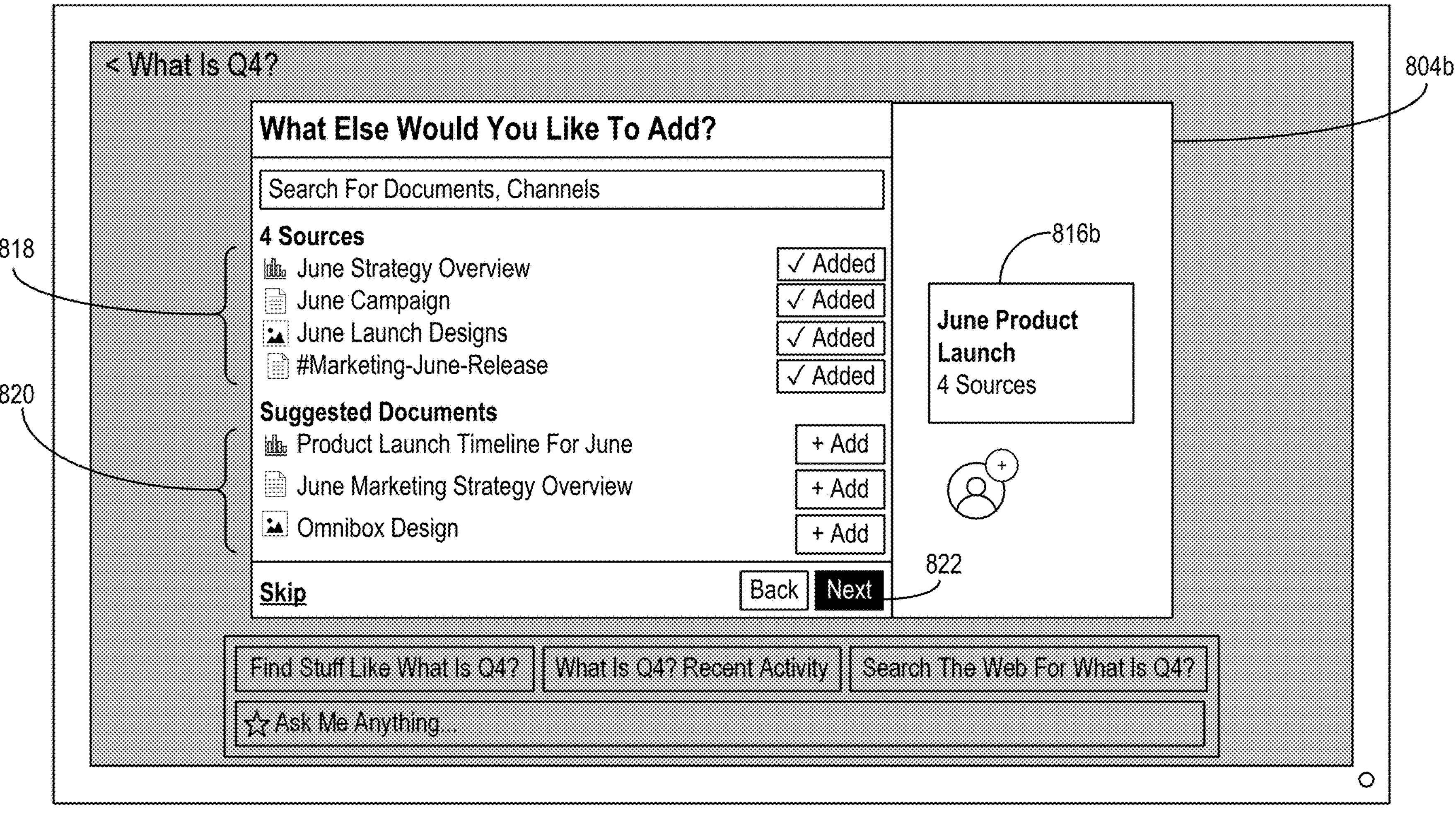
Figure 8C:
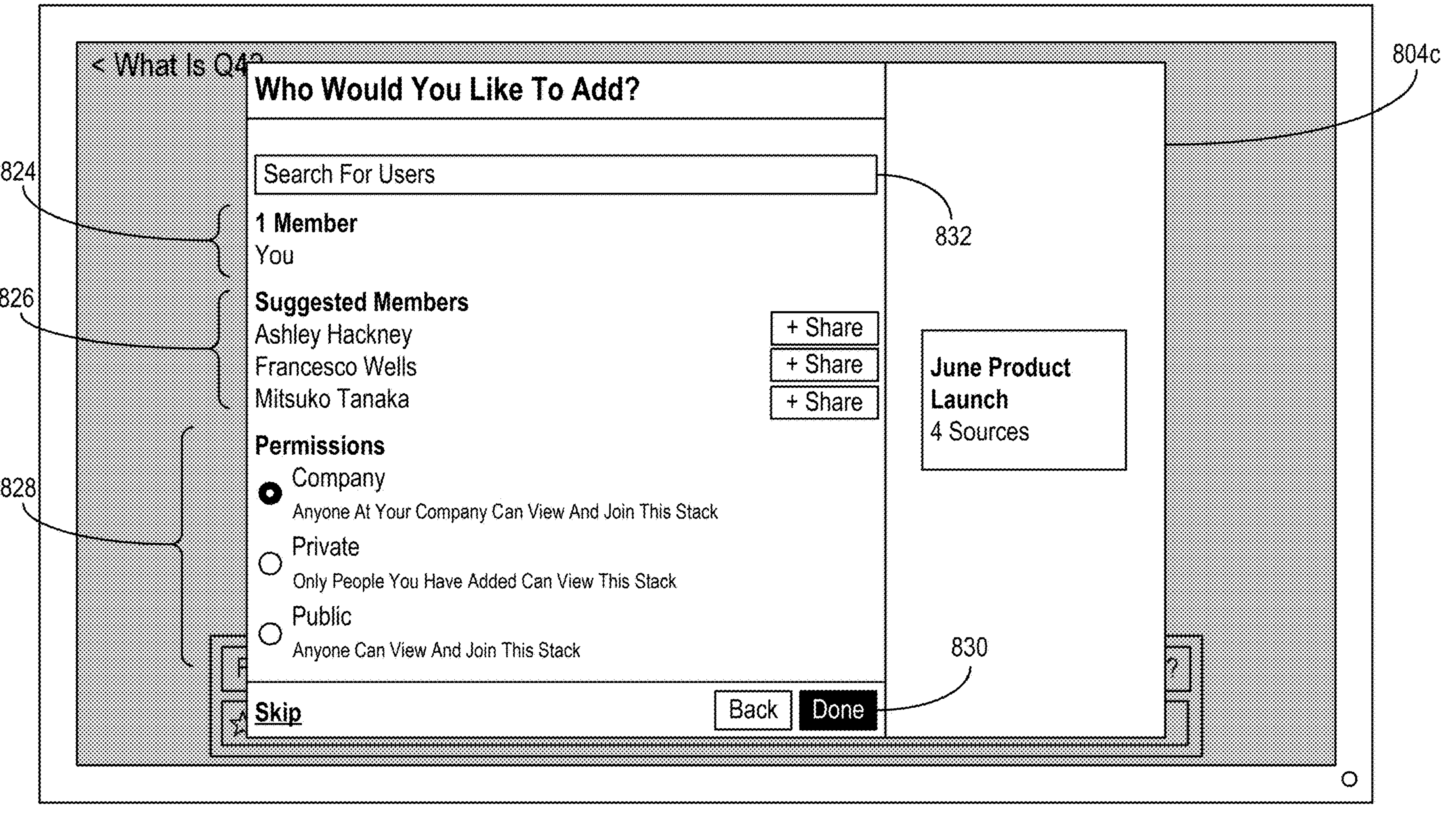
Figure 9:
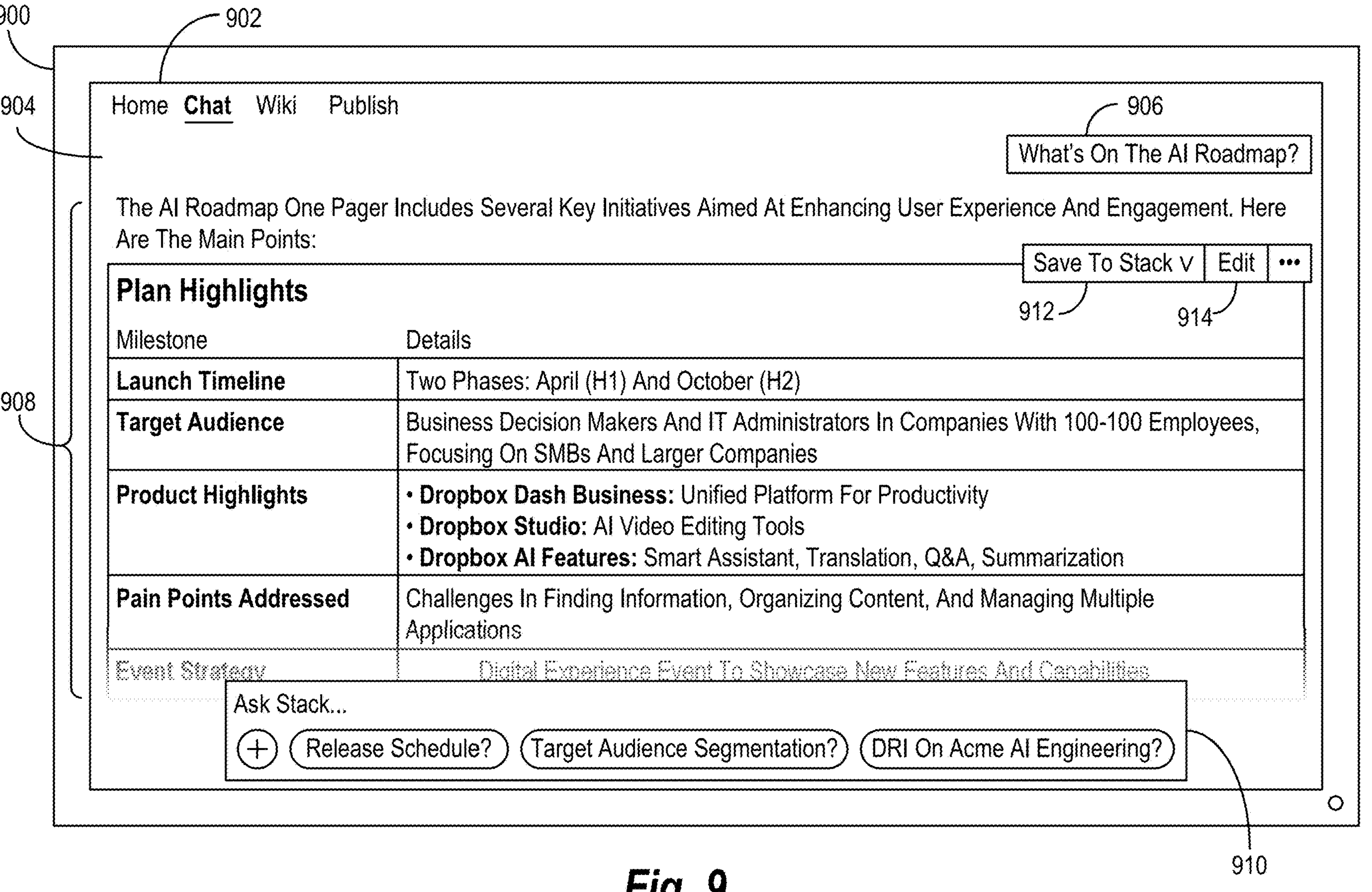
FIG. 9 illustrates a stack-level chat user interface in accordance with one or more embodiments of the present disclosure.
Figure 10:
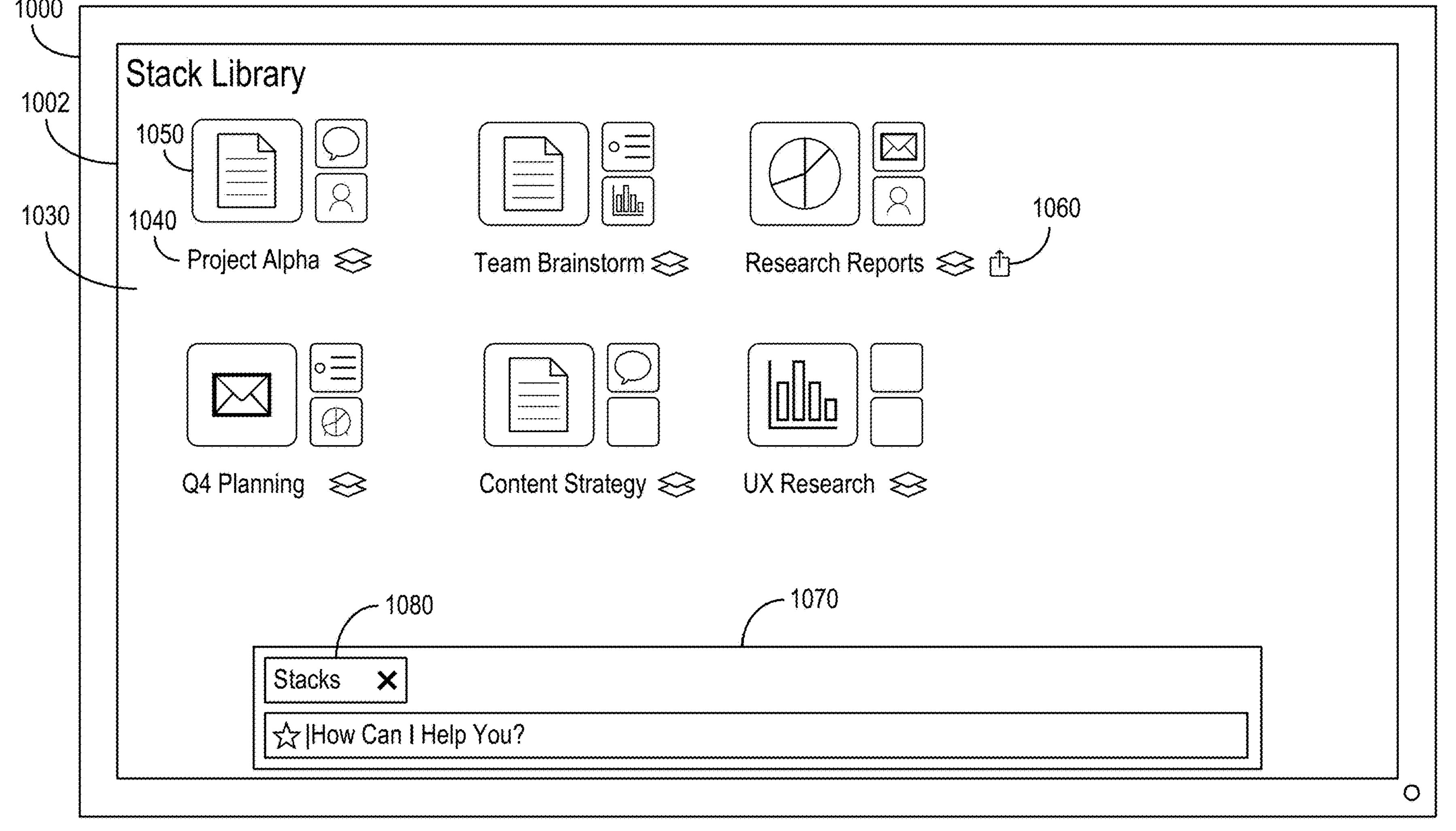
FIG. 10 illustrates an example stack library user interface in accordance with one or more implementations of the present disclosure.
Figure 11:
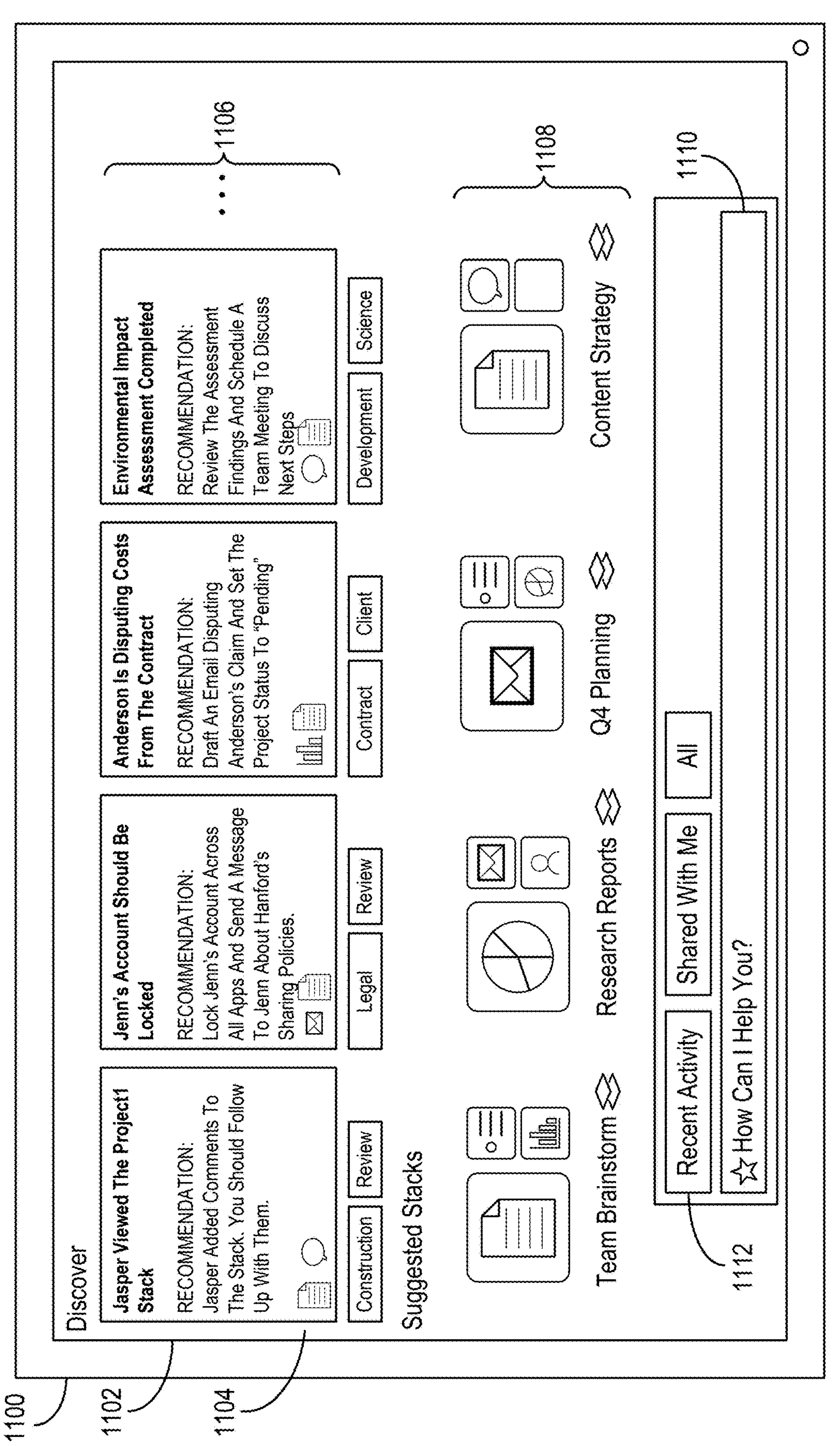
FIG. 11 illustrates example notifications in accordance with one or more embodiments of the present disclosure.

As discussed above, the stack canvas management system 120 can provide graphical user interfaces for generating and accessing stack canvases corresponding to content stack data containers. FIGS. 7A-11B illustrate a series of graphical user interfaces for generating and accessing stack canvases in accordance with one or more embodiments. By way of overview, FIGS. 7A-7D illustrate a series of chat-based stack creation user interfaces for utilizing an LLM to generate a content stack data container in accordance with one or more embodiments. FIGS. 8A-8C illustrate a series of assisted stack creation graphical user interfaces for manually creating a content stack data container in accordance with one or more embodiments. FIG. 9 illustrates a stack-level chat user interface in accordance with one or more embodiments of the present disclosure. FIG. 10 illustrates an example stack library user interface in accordance with one or more implementations of the present disclosure. FIG. 11 illustrates example notifications in accordance with one or more embodiments of the present disclosure.

Figure 7A:
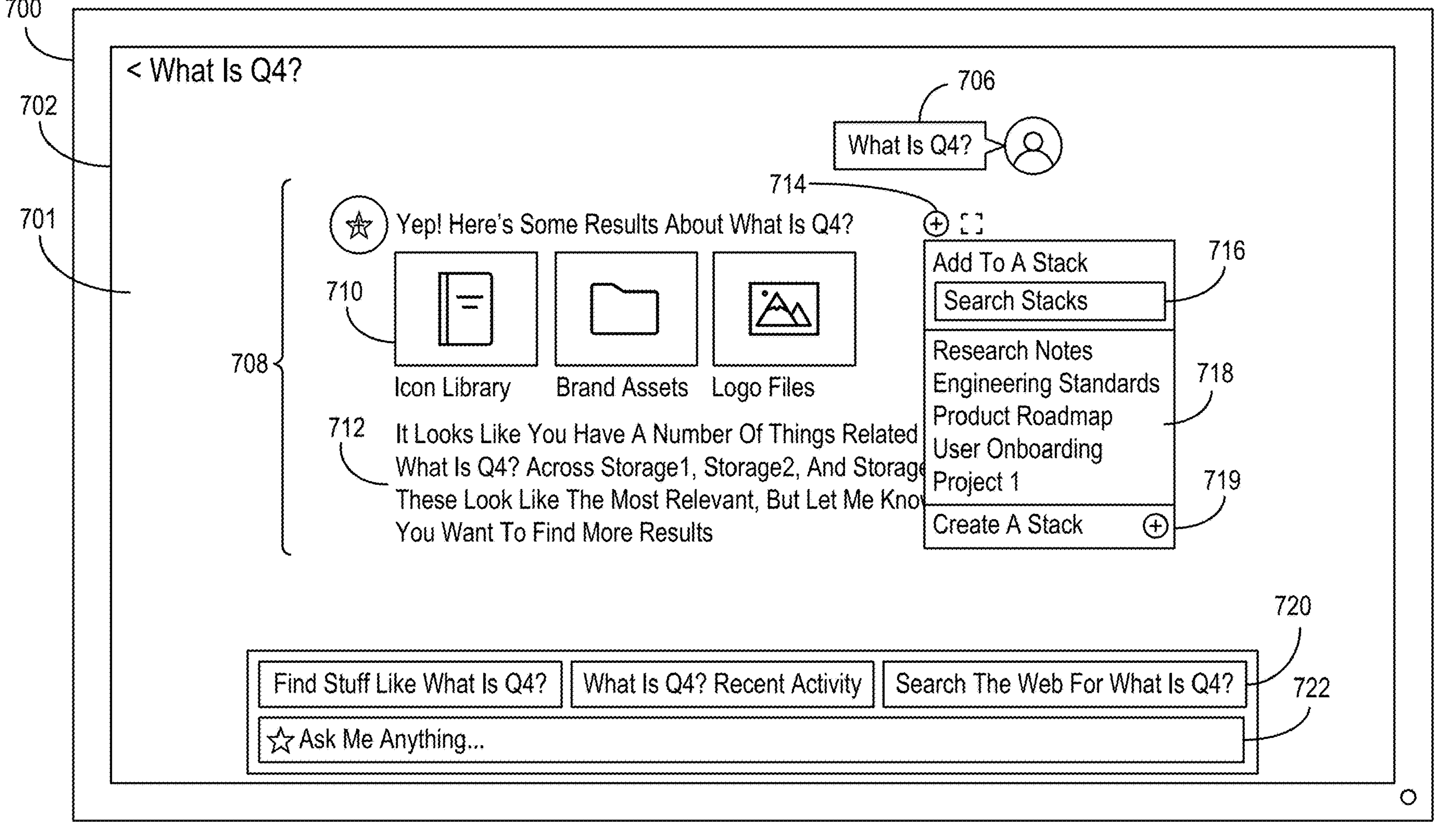
FIGS. 7A-7D illustrate a series of chat-based stack creation user interfaces for utilizing an LLM to generate a content stack data container in accordance with one or more embodiments.

As mentioned, FIGS. 7A-7D illustrate a series of chat-based stack creation user interfaces for utilizing an LLM to generate a content stack data container in accordance with one or more embodiments. FIG. 7A illustrates a chat-based stack creation user interface 701 on a screen 702 of a client device 700. The chat-based stack creation user interface 701 comprises a chat dialogue where a user is submitting queries to an LLM. For example, the stack canvas management system 120 can receive user queries, via chat element 722 within the chat-based stack creation user interface 701. As illustrated in FIG. 7A, the stack canvas management system 120 can provide suggested queries 720. The stack canvas management system 120 can submit a user query based on user selection of one of the suggested queries 720.

As shown in FIG. 7A, based on receiving the query 706 asking "What is Q4?" the stack canvas management system 120 uses the LLM to analyze content items within the cloud storage database. The stack canvas management system 120 surfaces the LLM response in a query response 708 comprising content items 710 and a text response 712. The content items 710 comprise content items that the stack canvas management system 120, using the LLM, has identified are relevant to the query 706. As shown, the content items 710 comprise different content item file types.

FIG. 7A further illustrates a stack creation element 714. Based on user selection of the stack creation element 714, the stack canvas management system 120 provides various options to add the content items 710 and/or the query response 708 to an existing content stack or to create a new content stack. The stack canvas management system 120 can provide, for display, a search stacks element 716 in which a user can begin inputting a desired stack in which to add the content items 710. The stack canvas management system 120 also provides a list of potential stacks 718 to which the stack canvas management system 120 can add the content items 710. Furthermore, based on selection of a create a stack element 719, the stack canvas management system 120 creates a new content stack based on the content items 710.

Figure 7B:
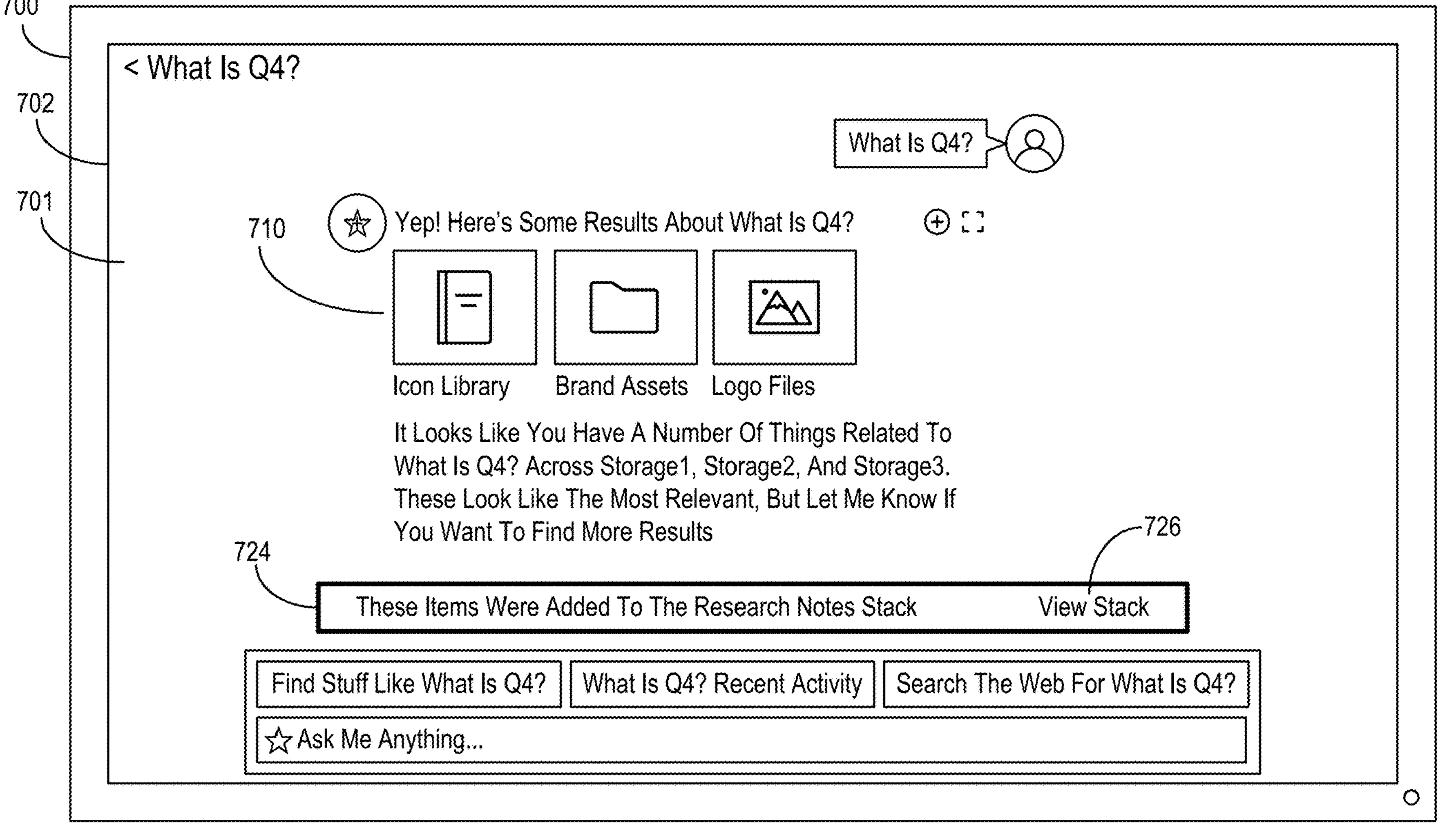

Based on user selection of "The Research Notes Stack" within the list of potential stacks 718, the stack canvas management system 120 adds the content items 710 to the research notes stack and updates the chat-based stack creation user interface 701. FIG. 7B illustrates an updated chat-based stack creation user interface after the stack canvas management system 120 adds the content items 710 to a user-selected stack.

FIG. 7B illustrates a stack update notification 724 within the chat-based stack creation user interface 701. The stack update notification 724 indicates that the stack canvas management system 120 added the content items 710 to the research notes stack. The stack update notification 724 includes a view stack element 726 for viewing the relevant stack canvas.

Figure 7C:
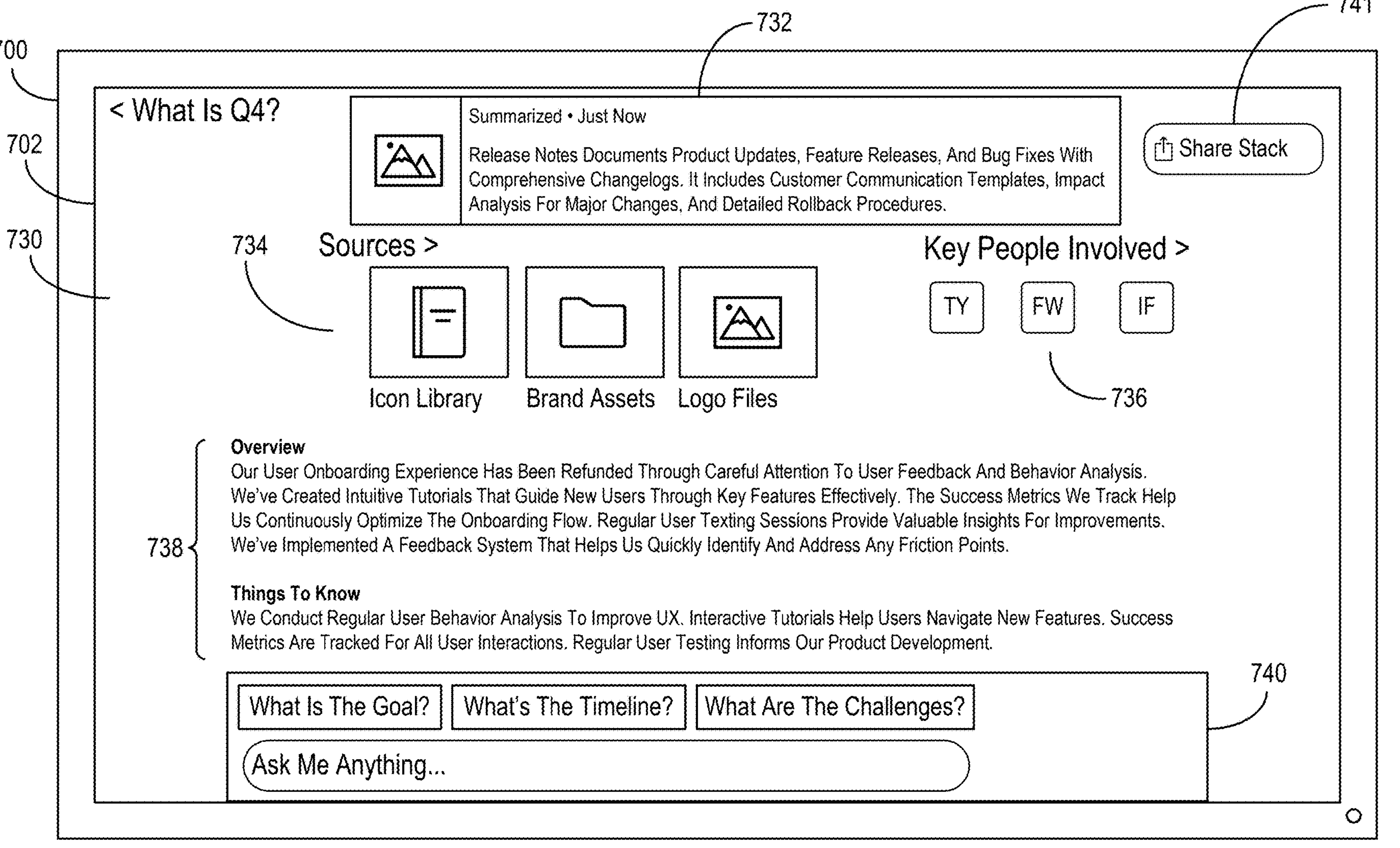

As illustrated in FIG. 7C, based on receiving user selection of the view stack element 726, the stack canvas management system 120 updates the screen 702 of the client device 700 to display a stack canvas graphical user interface 730. As mentioned, the stack canvas graphical user interface depicts visual representations of content items within a content stack and corresponding dynamic stack objects. As shown in FIG. 7C, the stack canvas graphical user interface 730 includes visual representations of the content items 734 together with various dynamic stack objects. Based on user selection of one of the content items 734, the stack canvas management system 120 can access and display the selected content item.

As shown in FIG. 7C, the stack canvas graphical user interface 730 also includes various dynamic stack objects. For example, the stack canvas management system 120 provides dynamic stack objects 738. The dynamic stack objects 738 comprise an "Overview" and "things to know" about content items within the corresponding content stack. The stack canvas management system 120 also provides a dynamic stack object 732 summarizing content items within the content stack.

As further shown in FIG. 7C, the stack canvas graphical user interface 730 includes a collaborating users element 736 reflecting users involved with the content stack data container. In some implementations, the collaborating users element 736 also includes access control information for the displayed user accounts. In one or more embodiments, the stack canvas management system 120 also automatically updates the collaborating users element 736 based on changes to users permitted to access the content stack data container.

As further shown in FIG. 7C, the stack canvas graphical user interface 730 also includes a stack-level chat element 740. The stack canvas management system 120 receives user queries related to the content stack data container via the stack-level chat element 740. As mentioned previously, the stack canvas management system 120 utilizes the LLM to analyze content items within the associated content stack based on user queries received via the stack-level chat element 740. In some examples, and as illustrated in FIG. 7C, the stack canvas management system 120 provides suggested queries. The stack canvas management system 120 can use a selected suggested query as a user query for the LLM.

In some embodiments, the stack-level chat element 740 illustrated in FIG. 7C includes a public and private chat toggle element. As mentioned, the stack canvas management system 120 allows users to submit queries in a public chat viewable by users that can access a stack canvas or a private chat viewable by a single user. The stack canvas management system 120 publishes LLM queries and query responses to the stack canvas viewable to members or to a private stack canvas based on user interaction with the public and private chat toggle element.

The stack canvas graphical user interface 730 illustrated in FIG. 7C further includes a share stack element 741. Based on user selection of the share stack element 741, the stack canvas management system 120 updates the screen to provide options for sharing the stack canvas or inviting users to access the content stack data container.

In some embodiments, the stack canvas management system 120 generates unique stack canvases for different users. For example, the stack canvas management system 120 can morph a stack canvas into different appearances or arrangements for different user accounts. Furthermore, in some instances, the stack canvas management system 120 includes different dynamic stack objects in stack canvases for different user accounts.

Figure 7D:
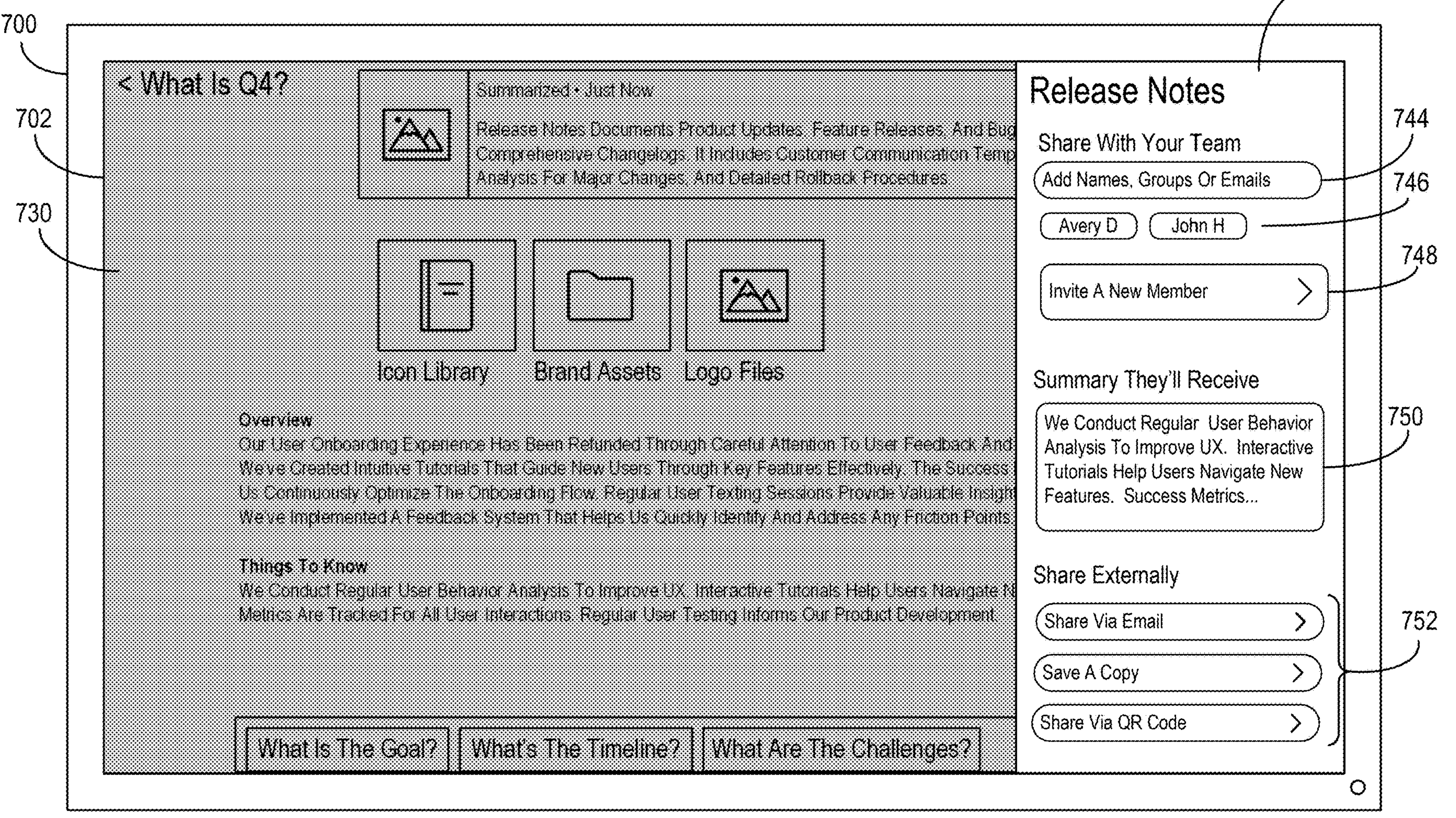

For example, and as illustrated in FIG. 7D, based on user selection of the share stack interface 742, the stack canvas management system 120 updates the stack canvas graphical user interface 730 to include a share stack interface 742. The share stack interface 742 includes a user search element 744. A user may begin typing a collaborator name into the user search element 744. The share stack interface 742 further includes suggested users 746. As mentioned previously, the stack canvas management system 120 grants access by users to the content stack data container based on user selection of one or more of the suggested users 746. As shown in FIG. 7D, the suggested users 746 may comprise users already grouped within the same organization or team as the creating user.

The share stack interface 742 illustrated in FIG. 7D also includes an invite new member element 748. Based on user selection of the invite new member element 748, the stack canvas management system 120 can invite a new user not already within the same organization or team to collaborate on the content stack data container.

FIG. 7D further illustrates a shared summary 750. In some implementations, the shared summary 750 comprises an LLM-generated dynamic stack object that summarizes content items within the content stack. The stack canvas management system 120 sends the shared summary 750 to users that the stack canvas management system 120 gives access to the stack canvas. In some embodiments, a user can edit text within the shared summary 750 prior to sending invites to the stack canvas.

As further shown in FIG. 7D, the stack canvas management system 120 further provides external share elements 752, enabling a user to share access to the stack canvas outside of the cloud storage database. For example, the stack canvas management system 120 can send an email with a link to the stack canvas, a copy of the stack canvas, or a QR code linking to the stack canvas.

In addition to utilizing an LLM to generate stack canvases, the stack canvas management system 120 also assists users in creating stack canvases. FIGS. 8A-8C illustrate a series of assisted stack creation user interfaces for manually creating a content stack data container in accordance with one or more embodiments.

FIG. 8A illustrates an assisted stack creation user interface 804*a* on a screen 802 of a client device 800. The stack canvas management system 120 presents the assisted stack creation user interface 804*a* to aid a user in manual creation of a content stack. As shown in FIG. 8A, the assisted stack creation user interface 804*a* includes a content item search element 806. The stack canvas management system 120 receives, via the content item search element 806 content items that the user would like to include within a content stack.

The assisted stack creation user interface 804*a* illustrated in FIG. 8A also includes suggested content stacks element 808. As mentioned, the stack canvas management system 120 utilizes an LLM to generate suggested content stacks. The stack canvas management system 120 provides the suggested content stacks for display on the client device via the suggested content stacks element 808. In some examples, and as illustrated in FIG. 8A, the suggested content stacks element 808 can include an informative title, the number of content items within each suggested content stack, an indication of information motivating creation of the suggested content stack (e.g., based on your or your team's activity), and a selectable element to initiate creation of a suggested content stack.

The assisted stack creation user interface 804*a* illustrated in FIG. 8A further includes a suggested content items element 810. The stack canvas management system 120 lists, within the suggested content items element 810, content items that the stack canvas management system 120 determines may be of interest to the user. As shown, the suggested content items element 810 also includes selectable add elements. Based on user selection of the add elements, the stack canvas management system 120 adds the corresponding content item to the content stack.

The assisted stack creation user interface 804*a* illustrated in FIG. 8A also includes a new stack preview 816*a*. The stack canvas management system 120 includes the new stack preview 816*a* to present basic information about the stack currently being created. For example, the new stack preview 816*a* includes a name for the new stack and content items (i.e., sources) included within the new stack.

The assisted stack creation user interface 804*a* illustrated in FIG. 8A also includes an add user element 812. Based on user selection of the add user element 812, the stack canvas management system 120 provides options to associate additional users with the content stack data container. In some embodiments, based on user selection of the add user element 812, the stack canvas management system 120 updates the assisted stack creation user interface 804*a* to display various additional user options as illustrated in FIG. 8C.

FIG. 8A further illustrates a next element 814 within the assisted stack creation user interface 804*a*. In some examples, based on user selection of the next element 814, the stack canvas management system 120 updates the assisted stack creation user interface 804*a* to display additional content items to add to a content stack.

For example, and as illustrated in FIG. 8B, the stack canvas management system 120 updates the assisted stack creation user interface 804*b* to provide additional content items that can be added to a content stack. In particular, the assisted stack creation user interface 804*b* illustrated in FIG. 8B includes a stack source list 818 comprising the list of content items already added to the content stack. The stack canvas management system 120 further provides a suggested content items list 820 comprising content items that the stack canvas management system 120 determines are relevant to the content stack based on the content items within the stack source list 818.

As further shown in FIG. 8B, in some implementations, the stack canvas management system 120 automatically updates the new stack preview 816*b*. For example, the stack canvas management system 120 automatically generates a content stack name based on content items within the content stack. The stack canvas management system 120 also updates the number of content items (i.e., sources) in the content stack within the 816*b*.

Based on user selection of the next element 822, the stack canvas management system 120 confirms selections of content items and updates the assisted stack creation user interface 804*b* to provide options for adding users to the content stack data container. For example, FIG. 8C illustrates an updated assisted stack creation user interface 804*c* that presents options to add users to the content stack data container.

FIG. 8C illustrates the assisted stack creation user interface 804*c* including a user search element 832, a list of authorized users 824, a list of suggested users 826, and a permissions element 828. The stack canvas management system 120 can receive user input of users to add via the user search element 832. The list of authorized users 824 displays users who currently have access to the content stack data container. In some embodiments, the list of authorized users 824 further displays access levels of authorized users. The list of suggested users 826 comprises suggested users as determined by the stack canvas management system 120. In some implementations, based on user selection of a share element within the list of suggested users 826, the stack canvas management system 120 provides additional options to select access levels for the users.

As further shown in FIG. 8C, the updated assisted stack creation user interface 804*c* includes the permissions element 828. The stack canvas management system 120 controls accessibility by other users to the content stack data container based on user selection within the permissions element 828. For instance, the stack canvas management system 120 can make the stack canvas viewable to members within a company, members that the user has invited to the stack, and the public.

Based on user selection of the done element 830 of the updated assisted stack creation user interface 804*c*, the stack canvas management system 120 creates a content stack based on user selected content items and user selected additional users.

As mentioned, the stack canvas management system 120 provides a stack-level chat by which the stack canvas management system 120 can utilize an LLM to analyze limited content items within a content stack. FIG. 9 illustrates a stack-level chat user interface in accordance with one or more embodiments of the present disclosure. FIG. 9 illustrates a stack-level chat user interface 904 on a screen 902 of a client device 900.

FIG. 9 illustrates a stack-level chat element 910. The stack-level chat element 910 includes suggested queries. The stack canvas management system 120 can query the LLM based on user selection of one of the suggested queries. Furthermore, the stack canvas management system 120 receives user queries via the stack-level chat element 910.

The stack-level chat user interface 904 illustrated in FIG. 9 further includes a user query 906. The stack canvas management system 120 utilizes the user query 906 together with the content stack as input into the LLM. The stack canvas management system 120 provides the query response 908 within the stack-level chat user interface 904. As shown, the user query 906 includes a table titled "Plan highlights."

The stack canvas management system 120 can utilize the stack-level chat function to generate dynamic stack objects to add to the content stack data container. As shown in FIG. 9, the stack canvas management system 120 provides options to add the query response 908 to the stack. The stack canvas management system 120 provides a save to stack element 912 in relation to the query response 908. Based on user selection of the element 912, the stack canvas management system 120 adds the query response 908 to the content stack data container as a dynamic stack object. The stack canvas management system 120 displays the query response 908 within the stack canvas and automatically updates the query response 908 as the content stack is modified. In some examples, the stack canvas management system 120 adds the entire query response to the content stack data container. In other examples, the stack canvas management system 120 adds visual elements (e.g., the table) from query responses to the stack canvas.

FIG. 9 further illustrates a query response edit element 914 within the stack-level chat user interface 904. Based on user interaction with the query response edit element 914, the stack canvas management system 120 provides options to edit the query response before adding it to the content stack data container. For instance, the stack canvas management system 120 can edit the plan highlights table within the query response 908 based on user interaction with the query response edit element 914.

The stack canvas management system 120 provides several entry points to a stack canvas. In particular, the stack canvas management system 120 can provide a stack library comprising a repository of content stack data containers. The stack canvas management system 120 provides a stack canvas based on user selection of the corresponding content stack data container from the stack library. Additionally, the stack canvas management system 120 can provide access to a stack canvas through an LLM chat element. For instance, the stack canvas management system 120 can provide a link to a stack canvas as a query response. Additionally, the stack canvas management system 120 can provide access to a stack canvas by linking a stack canvas with its component content items.

As mentioned, the stack canvas management system 120 provides a stack library as one entry point to a stack canvas. FIG. 10 illustrates an example stack library user interface in accordance with one or more implementations of the present disclosure.

FIG. 10 illustrates a stack library user interface 1030 on a screen 1002 of a client device 1000. The stack library provides users with access to a collection of content stack data containers. The stack library serves as a navigation layer and offers entry points to multiple stack canvases. As shown in FIG. 10, the stack library user interface 1030 includes references to stack canvases. The references to stack canvases can include a stack canvas preview 1050, a content stack label 1040, and a share content stack element 1060. Based on user selection of the share content stack element 1060, the stack canvas management system 120 provides methods for sharing the corresponding content stack.

As shown in FIG. 10, the stack library user interface 1030 includes an LLM chat element 1070. The LLM chat element 1070 further includes a scope tag 1080 that indicates the scope of data that the stack canvas management system 120 will use the LLM to analyze. For instance, the scope tag 1080 indicates that a query will be directed at the stacks within the stack library. The stack canvas management system 120 can receive a query via the LLM chat element 1070 and return a query response using the same. In some embodiments, the stack canvas management system 120 includes, within the query response, links to specific content stack data containers.

In some implementations, the stack canvas management system 120 incorporates an endless scroll function in the stack library. Endless scroll is described in U.S. patent application Ser. No. 18/977,663, titled "ENDLESS SCROLL CONTENT RETRIEVAL," filed Dec. 11, 2024, the contents of which are hereby incorporated by reference in their entirety.

In some embodiments, the stack canvas management system 120 provides notifications of content stack modifications. FIG. 11 illustrates example notifications in accordance with one or more embodiments of the present disclosure.

FIG. 11 illustrates a discover user interface 1104 on a screen 1102 of a client device 1100. The stack canvas management system 120 presents the discover user interface 1104 to help users access relevant content and notifications in an efficient manner. The discover user interface 1104 includes notifications 1106 that indicate content stack data container modifications that may be relevant to the user. For example, the notifications 1106 can indicate the modification (e.g., Jasper viewed the project 1 stack) and a recommended action item (e.g., follow up with comments). The notifications 1106 further includes icons that indicate the content type of content items modified within the corresponding content stack.

The discover user interface 1104 of FIG. 11 further includes suggested content stacks 1108. More specifically, the stack canvas management system 120 generates suggested content stacks and provides them on the client device. The stack canvas management system 120 generates a new content stack based on user selection of one or more of the suggested content stacks.

As illustrated in FIG. 11, the discover user interface 1104 further includes an LLM chat element 1110. The LLM chat element in FIG. 11 includes scope tags 1112. As mentioned previously, the stack canvas management system 120 modifies the scope of data objects input into the LLM based on user-selected scope tags. To illustrate, based on receiving user selection of the "recent activity" scope tag, the stack canvas management system 120 utilizes the LLM to query the limited scope of content items or stacks that have been recently created or modified.

FIGS. 1-11, the corresponding text, and the examples provide a number of different systems and methods for updating a search index to include a synthesized content item based on a synthesized connector in accordance with one or more embodiments. In addition to the foregoing, implementations can also be described in terms of flowcharts comprising acts steps in a method for accomplishing a particular result. For example, FIG. 12 illustrates an example series of acts for providing a stack canvas corresponding to a generated content stack data container in accordance with one or more embodiments of the present disclosure.

Figure 12:
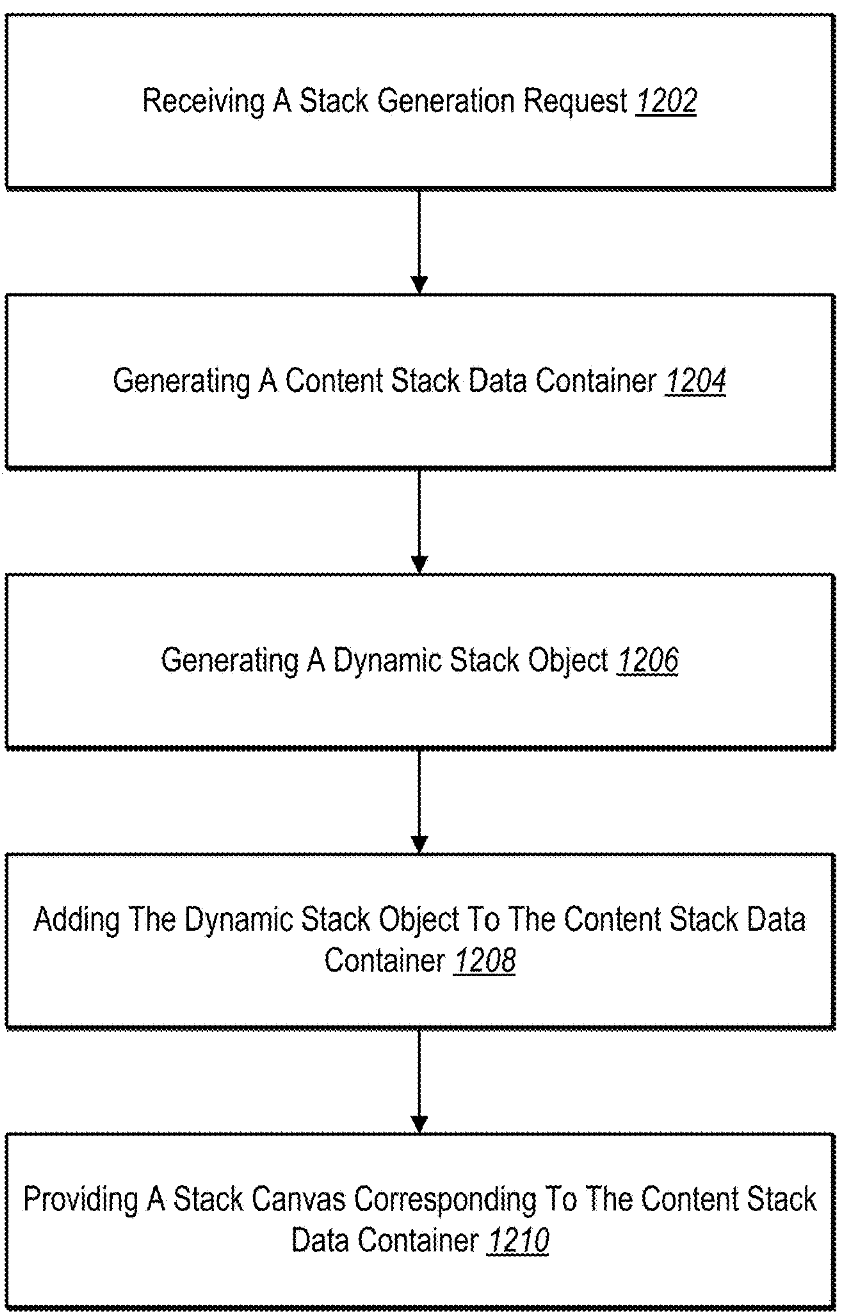
FIG. 12 illustrates a flowchart of a series of acts generating a content stack data container and providing a stack canvas corresponding to the content stack data container in accordance with one or more embodiments.

As illustrated in FIG. 12, the series of acts 1200 includes an act 1202 of receiving a stack generation request. In particular, the act 1202 comprises receiving, from a client device, a stack generation request indicating a content item from a cloud storage database to include in a content stack.

As illustrated in FIG. 12, the series of acts 1200 includes an act 1204 of generating a stack data container. In particular, the act 1204 comprises generating, in response to the stack generation request, a content stack data container comprising a reference to the content item from the cloud storage database.

As further illustrated in FIG. 12, the series of acts 1200 includes an act 1206 of generating a dynamic stack object. In particular, the act 1206 comprises generating, using a large language model to process the content item from the cloud storage database, a dynamic stack object to include within the content stack data container.

As further illustrated in FIG. 12, the series of acts 1200 includes an act 1208 of adding the dynamic stack object to the content stack data container. In particular, the act 1208 comprises adding the dynamic stack object to the content stack data container.

As further illustrated in FIG. 12, the series of acts 1200 includes an act 1210 of providing a stack canvas corresponding to the content stack data container. In particular, the act 1210 comprises providing, for display on the client device, a stack canvas corresponding to the content stack data container, the stack canvas depicting the dynamic stack object and a visual representation of the content item from the cloud storage database.

In some embodiments, the series of acts 1200 further comprises the acts of receiving, from the client device associated with a user account, a request to associate an additional user account with the content stack data container; and providing, for display on an additional client device associated with the additional user account, the stack canvas.

In some embodiments, the series of acts 1200 further comprises additional acts of detecting a modification to the content stack; generating, based on the modification to the content stack and using the large language model, an updated dynamic stack object to include within the content stack data container; and providing, for display on the client device, the stack canvas depicting the updated dynamic stack object. In some embodiments, the additional acts further comprise generating a notification indicating the modification to the content stack; and including, within the stack canvas corresponding to the content stack data container, the notification indicating the modification to the content stack.

In some embodiments, and as part of the series of acts 1200, the modification to the content stack comprises at least one of: an inclusion of an additional user with access to the content stack; an inclusion of an additional content item in the content stack; removal of the content item from the content stack; or a modification to the content item within the content stack.

In some embodiments, the series of acts 1200 further includes additional acts of providing, for display on the client device and within the stack canvas, a stack-level chat box; receiving, from the client device and via the stack-level chat box, a query related to the content stack data container; generating, using the large language model to process one or more content items in the content stack, a query response; and providing, for display within the stack canvas, the query response. Furthermore, in some embodiments, the additional acts further comprise receiving, from the client device, a request to add the query response to the content stack data container; generating a response content item based on the query response; adding the response content item to the content stack data container; and providing, for display on the client device, the stack canvas depicting the response content item.

In some embodiments, the series of acts 1200 further includes additional acts of receiving, from the client device and via the stack canvas, a dynamic stack object generation request; generating, based on the dynamic stack object generation request, an additional dynamic stack object; and adding the additional dynamic stack object to the content stack data container.

In some implementations, the series of acts further comprise receiving the stack generation request by: generating, using the large language model to process content items from the cloud storage database, a suggested content stack comprising one or more related content items, wherein the one or more related content items comprise the content item; providing, for display via the client device, the suggested content stack; and receiving, from the client device, a suggested stack generation request.

In some embodiments, the series of acts 1200 includes additional acts of determining an expiry condition for the content stack data container; and archiving the content stack data container based on determining that the expiry condition has been met.

In some embodiments, the series of acts 1200 includes additional acts of receiving, from the client device and via the stack canvas, a content block; and adding the content block to the content stack data container.

Additionally, the series of acts 1200 can further include generating an additional content stack data container by: generating, using the large language model to process content items from the cloud storage database, a suggested content stack data container comprising one or more references to one or more related content items and a corresponding additional dynamic stack object; and providing, for display on the client device and within a stack library, a reference to the suggested content stack data container.

In one or more implementations, each of the components of the stack canvas management system 120 are in communication with one another using any suitable communication technologies. Additionally, the components of the stack canvas management system 120 can be in communication with one or more other devices including one or more client devices described above. It will be recognized that in as much the stack canvas management system 120 is shown to be separate in the above description, any of the subcomponents may be combined into fewer components, such as into a single component, or divided into more components as may serve a particular implementation.

Figure 13:
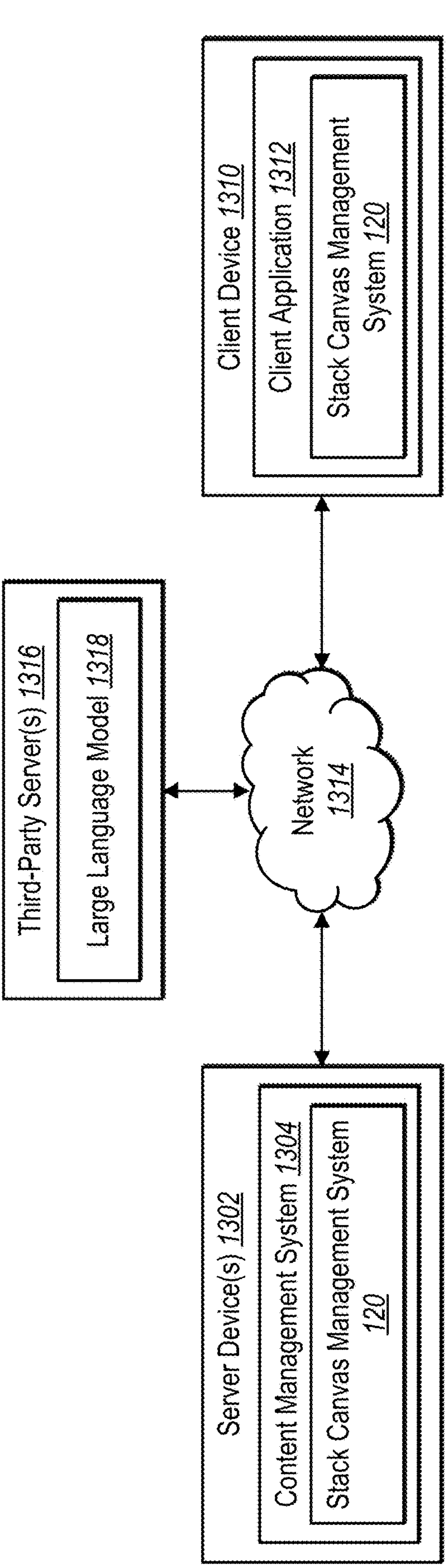
FIG. 13 illustrates an example environment within which a stack canvas management system can operate in accordance with one or more embodiments.

Additional detail regarding the connector management system will now be provided with reference to the figures. For example, FIG. 13 illustrates a schematic diagram of an example system environment for implementing a stack canvas management system 120 in accordance with one or more implementations. An overview of the stack canvas management system 120 is described in relation to FIG. 13.

As shown, the environment includes server(s) 1302, a client device 1310, third-party server(s) 1316, and a network 1314. Each of the components of the environment can communicate via the network 1314, and the network 1314 may be any suitable network over which computing devices can communicate. Example networks are discussed in more detail below in relation to FIGS. 14-15.

As mentioned above, the example environment includes a client device 1310. The client device 1310 can be one of a variety of computing devices, including a smartphone, a tablet, a smart television, a desktop computer, a laptop computer, a virtual reality device, an augmented reality device, or another computing device as described in relation to FIGS. 14-15. The client device 1310 can communicate with the server(s) 1302 via the network 1314. For example, the client device 1310 can receive user input from a user interacting with the client device 1310 (e.g., via the client application 1312 or the third-party application 1318) to, for instance, access, navigate, download, link, or share a data from a third-party application 1318 within the third-party server(s) 1316, to search for one or more content items or to select a selectable connector suggestion. In addition, the stack canvas management system 120 on the server(s) 1302 can receive information relating to various interactions with user interface elements based on the input received by the client device 1310 (e.g., to search for one or more content items from the third-party application in the third-party server(s) 1316 and the content management system 1304).

As shown, the client device 1310 can include a client application 1312. In particular, the client application 1312 may be a web application, a native application installed on the client device 1310 (e.g., a mobile application, a desktop application, etc.), or a cloud-based application where all or part of the functionality is performed by the server(s) 1302. Based on instructions from the client application 1312, the client device 1310 can present or display information, including a search result with one or more content items stored or associated with third-party applications.

As illustrated in FIG. 13, the example environment also includes the server(s) 1302. The server(s) 1302 may generate, track, store, process, receive, search, communicatively link, and transmit electronic data, such as digital content (e.g., content items), datasets, searchable data, pages of data, prompts, interface elements, searches, browsing activity, browsing data, interactions with interface elements, interactions with selectable connector suggestions, and/or interactions between user accounts or client devices. For example, the server(s) 1302 may receive data from the client device 1310 in the form of a search for a content item or one or more content items related to a topic from a third-party application 1318 external to the content management system 1304. In addition, the server(s) 1302 can transmit data to the client device 1310 in the form of a search result with one or more content items associated with the third-party application 1318 that is linked to the content management system 1304. In some cases, the server(s) 1302 can transmit a selectable connector suggestion to link the third-party application 1318 with the content management system 1304. Indeed, the server(s) 1302 can communicate with the client device 1310 to send and/or receive data via the network 1314. In some implementations, the server(s) 1302 comprise(s) a distributed server where the server(s) 1302 include(s) a number of server devices distributed across the network 1314 and located in different physical locations. The server(s) 1302 can comprise one or more content servers, application servers, communication servers, web-hosting servers, machine learning server, and other types of servers.

As shown in FIG. 13, the server(s) 1302 can also include the stack canvas management system 120 as part of a content management system 1304. The content management system 1304 can communicate with the client device 1310 to perform various functions associated with the client application 1312 such as searching a linked third-party application 1318, identifying the third-party application 1318 based on browsing data, and/or generating a digital connection between the third-party application 1318 and a user account on the content management system 1304. Indeed, the content management system 1304 can include a network-based smart cloud storage system to manage, store, synchronize, and maintain content items associated with user accounts within the content management system and link the content management system 1304 to third-party applications external to the content management system 1304. In some embodiments, stack canvas management system 120 and/or the content management system 1304 utilize a database to store and access the content items associated with the third-party application 1318.

FIG. 13 further illustrates a third-party server(s) 1316. In particular, the third-party server(s) 1316 can host or house a third-party application 1318 that includes or that searches or generates (as part of its native application functions) one or more content items. For example, the third-party server(s) 1316 can include a server location hosting the third-party application 1318 that is external to the stack canvas management system 120 and the content management system 1304. In some cases, the third-party server(s) 1316 is external to the stack canvas management system 120, but the stack canvas management system 120 can nevertheless access the third-party application 1318 via one or more, connectors, plugins, APIs, or other network-based access protocols.

Although FIG. 13 depicts the stack canvas management system 120 located on the server(s) 1302, in some implementations, the stack canvas management system 120 may be implemented by (e.g., located entirely or in part on) one or more other components of the environment. For example, the stack canvas management system 120 may be implemented by the client device 1310 and/or a third-party device. For example, the client device 1310 can download all or part of the stack canvas management system 120 for implementation independent of, or together with, the server(s) 1302.

In some implementations, though not illustrated in FIG. 13, the environment may have a different arrangement of components and/or may have a different number or set of components altogether. For example, the client device 1310 may communicate directly with the stack canvas management system 120 bypassing the network 1314. As another example, the environment can include a database located external to the server(s) 1302 (e.g., in communication via the network 1314) or located on the server(s) 1302, on a third-party server(s) 1316, and/or on the client device 1310.

FIG. 8 illustrates a block diagram of exemplary computing device 800 that may be configured to perform one or more of the processes described above. The components of the stack canvas management system 120 can include software, hardware, or both. For example, the components of the stack canvas management system 120 can include one or more instructions stored on a computer-readable storage medium and executable by processors of one or more computing devices (e.g., the computing device 800). When executed by the one or more processors, the computer-executable instructions of the stack canvas management system 120 can cause the computing device 800 to perform the methods described herein. Alternatively, the components of the stack canvas management system 120 can comprise hardware, such as a special purpose processing device to perform a certain function or group of functions. Additionally, or alternatively, the components of the stack canvas management system 120 can include a combination of computer-executable instructions and hardware.

Furthermore, the components of the stack canvas management system 120 performing the functions described herein may, for example, be implemented as part of a stand-alone application, as a module of an application, as a plug-in for applications including content management applications, as a library function or functions that may be called by other applications, and/or as a cloud-computing model. Thus, the components of the stack canvas management system 120 may be implemented as part of a stand-alone application on a personal computing device or a mobile device.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
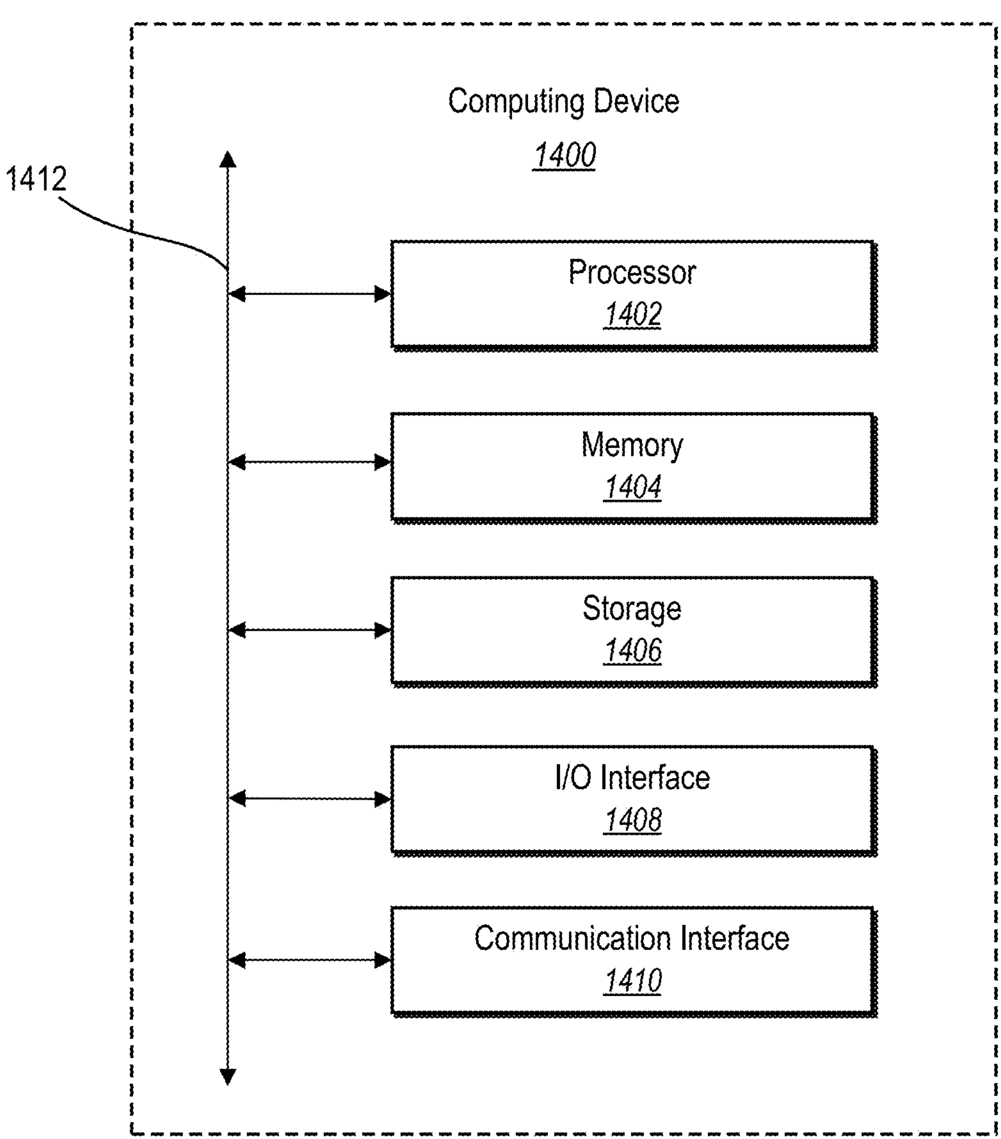
FIG. 14 illustrates a block diagram of an exemplary computing device in accordance with one or more embodiments.

As mentioned, FIG. 14 illustrates a block diagram of exemplary computing device 1400 that may be configured to perform one or more of the processes described above. One will appreciate that third-party server(s) 1302, the client device 1310, and/or the computing device 1400 may comprise one or more computing devices such as computing device 1400. As shown by FIG. 14, computing device 1400 can comprise processor 1402, memory 1404, a storage device, a I/O interface, and communication interface 1410, which may be communicatively coupled by way of communication infrastructure 1412. While an exemplary computing device 1400 is shown in FIG. 14, the components illustrated in FIG. 14 are not intended to be limiting. Additional or alternative components may be used in other implementations. Furthermore, in certain implementations, computing device 1400 can include fewer components than those shown in FIG. 14. Components of computing device 1400 shown in FIG. 14 will now be described in additional detail.

In particular implementations, processor 1402 includes hardware for executing instructions, such as those making up a computer program. As an example, and not by way of limitation, to execute instructions, processor 1402 may retrieve (or fetch) the instructions from an internal register, an internal cache, memory 1404, or storage device 1406 and decode and execute them. In particular implementations, processor 1402 may include one or more internal caches for data, instructions, or addresses. As an example, and not by way of limitation, processor 1402 may include one or more instruction caches, one or more data caches, and one or more translation lookaside buffers (TLBs). Instructions in the instruction caches may be copies of instructions in memory 1404 or storage device 1406.

Memory 1404 may be used for storing data, metadata, and programs for execution by the processor(s). Memory 1404 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 1404 may be internal or distributed memory.

Storage device 1406 includes storage for storing data or instructions. As an example, and not by way of limitation, storage device 1406 can comprise a non-transitory storage medium described above. Storage device 1406 may include a hard disk drive (HDD), a floppy disk drive, flash memory, an optical disc, a magneto-optical disc, magnetic tape, or a Universal Serial Bus (USB) drive or a combination of two or more of these. Storage device 1406 may include removable or non-removable (or fixed) media, where appropriate. Storage device 1406 may be internal or external to computing device 1400. In particular implementations, storage device 1406 is non-volatile, solid-state memory. In other implementations, Storage device 1406 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1408 allows a user to provide input to, receive output from, and otherwise transfer data to and receive data from computing device 1400. I/O interface 1408 may include a mouse, a keypad or a keyboard, a touch screen, a camera, an optical scanner, network interface, modem, other known I/O devices or a combination of such I/O interfaces. I/O interface 1408 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1408 is configured to provide graphical data to a display for presentation to a user. The graphical data may be representative of one or more graphical interfaces and/or any other graphical content as may serve a particular implementation.

Communication interface 1410 can include hardware, software, or both. In any event, communication interface 1410 can provide one or more interfaces for communication (such as, for example, packet-based communication) between computing device 1400 and one or more other computing devices or networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1410 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1410 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1410 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1412 may include hardware, software, or both that couples components of computing device 1400 to each other. As an example and not by way of limitation, communication infrastructure 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 15:
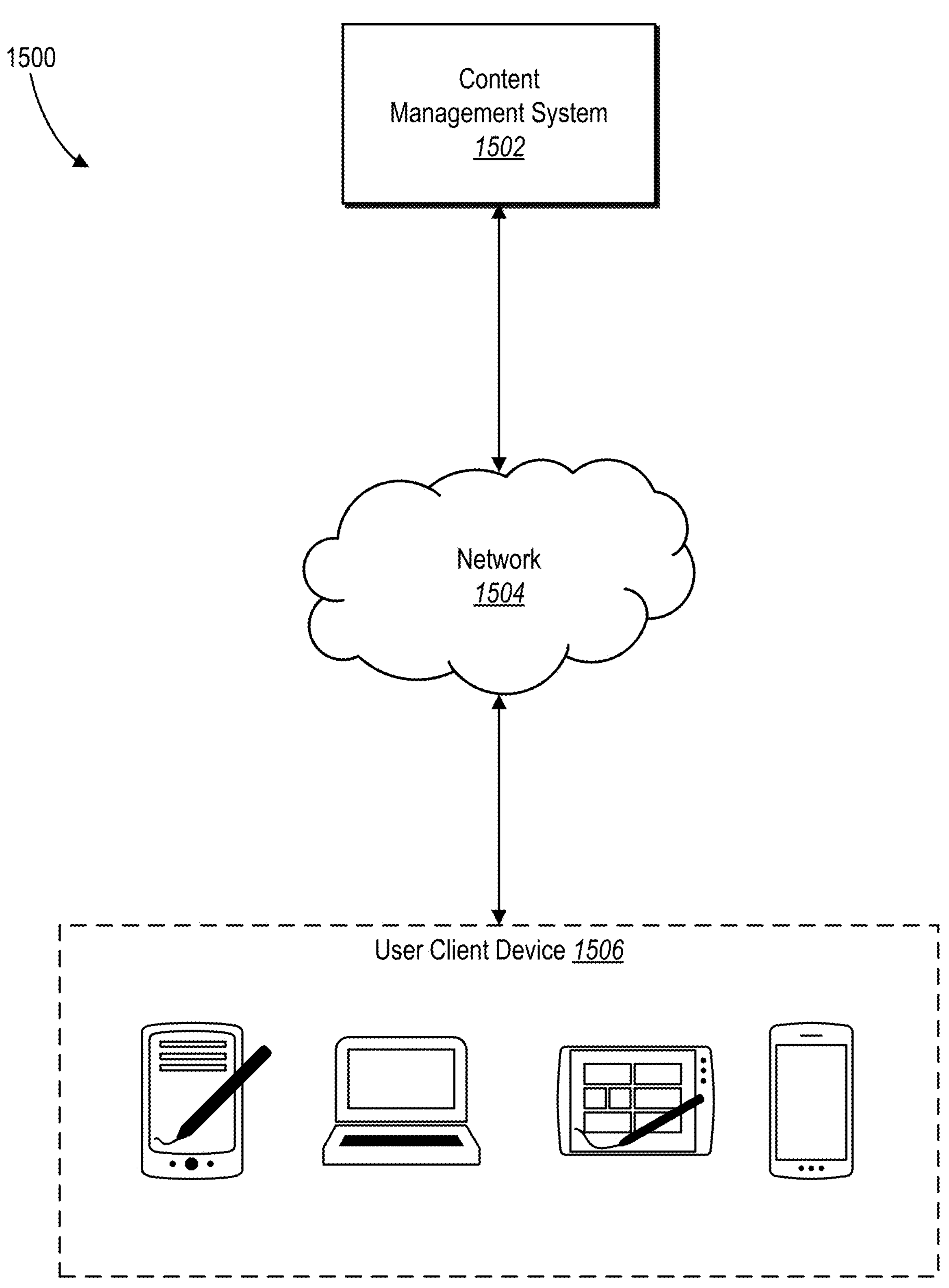
FIG. 15 illustrates a networking environment of a stack canvas management system in accordance with one or more embodiments.

FIG. 15 is a schematic diagram illustrating environment 1500 within which one or more implementations of the stack canvas management system 120 can be implemented. As discussed above with respect to FIG. 15, in some embodiments the stack canvas management system 120 can be part of a content management system 1502. In one or more embodiments, the content management system 1502 may generate, store, manage, receive, and send digital content (such as digital videos). For example, content management system 1502 may send and receive digital content to and from the user client device 1506 by way of network 1504. In particular, the content management system 1502 can store and manage a collection of digital content. The content management system 1502 can manage the sharing of digital content between computing devices associated with a plurality of users. For instance, the content management system 1502 can facilitate a user sharing a digital content with another user of content management system 1502.

In particular, the content management system 1502 can manage synchronizing digital content across multiple of the user client device 1506 associated with one or more users. For example, a user may edit digital content using user client device 1506. The content management system 1502 can cause user client device 1506 to send the edited digital content to content management system 1502. Content management system 1502 then synchronizes the edited digital content on one or more additional computing devices.

In addition to synchronizing digital content across multiple devices, one or more implementations of content management system 1502 can provide an efficient storage option for users that have large collections of digital content. For example, content management system 1502 can store a collection of digital content on content management system 1502, while the user client device 1506 only stores reduced-sized versions of the digital content. A user can navigate and browse the reduced-sized versions (e.g., a thumbnail of a digital image) of the digital content on user client device 1506. In particular, one way in which a user can experience digital content is to browse the reduced-sized versions of the digital content on user client device 1506.

Another way in which a user can experience digital content is to select a reduced-size version of digital content to request the full- or high-resolution version of digital content from content management system 1502. In particular, upon a user selecting a reduced-sized version of digital content, user client device 1506 sends a request to content management system 1502 requesting the digital content associated with the reduced-sized version of the digital content. Content management system 1502 can respond to the request by sending the digital content to user client device 1506. User client device 1506, upon receiving the digital content, can then present the digital content to the user. In this way, a user can have access to large collections of digital content while minimizing the amount of resources used on user client device 1506.

User client device 1506 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. User client device 1506 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1504.

Network 1504 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which user client devices 1506 may access content management system 1502.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

receiving, from a client device, a stack generation request indicating a content item from a cloud storage database to include in a content stack;

generating, in response to the stack generation request, a content stack data container comprising references to a subset of relevant content items from the cloud storage database, the references to the subset of relevant content items comprising a reference to the content item;

generating, using a large language model to process the subset of relevant content items from the cloud storage database, a dynamic stack object to include within the content stack data container;

adding the dynamic stack object to the content stack data container;

providing, for display on the client device, a stack canvas corresponding to the content stack data container, the stack canvas comprising the dynamic stack object, a visual representation of the content item from the cloud storage database, and a stack-level chat box;

receiving, from the client device and via the stack-level chat box, a user query related to the subset of relevant content items within the content stack data container;

generating a query response by using the large language model to process (i) the user query and (ii) a limited number of content items comprising the subset of relevant content items in the content stack data container; and providing, for display within the stack canvas, the query response.

2. The computer-implemented method of claim 1, further comprising:

receiving, from the client device associated with a user account, a request to associate an additional user account with the content stack data container; and providing, for display on an additional client device associated with the additional user account, the stack canvas.

3. The computer-implemented method of claim 1, further comprising:

detecting a modification to the content stack;

generating, based on the modification to the content stack and using the large language model, an updated dynamic stack object to include within the content stack data container; and providing, for display on the client device, the stack canvas depicting the updated dynamic stack object.

4. The computer-implemented method of claim 3, wherein the modification to the content stack comprises at least one of:

an inclusion of an additional user with access to the content stack;

an inclusion of an additional content item in the content stack;

removal of the content item from the content stack; or a modification to the content item within the content stack.

5. The computer-implemented method of claim 3, further comprising:

generating a notification indicating the modification to the content stack; and including, within the stack canvas corresponding to the content stack data container, the notification indicating the modification to the content stack.

6. The computer-implemented method of claim 1, further comprising:

receiving, from the client device and via the stack canvas, a selection of content items from the subset of relevant content items;

receiving, from the client device and via the stack-level chat box, a second user query related to the selected content items;

generating a second query response using the large language model to process (i) the second user query and (ii) the selected content items; and providing, for display within the stack canvas, the second query response.

7. The computer-implemented method of claim 1, further comprising:

receiving, from the client device, a request to add the query response to the content stack data container;

generating a response content item based on the query response;

adding the response content item to the content stack data container; and providing, for display on the client device, the stack canvas depicting the response content item.

8. The computer-implemented method of claim 1, further comprising:

receiving, from the client device and via the stack canvas, a content block comprising a user-generated data object; and adding the content block to the content stack data container.

9. The computer-implemented method of claim 1, further comprising generating an additional content stack data container by:

generating, using the large language model to process content items from the cloud storage database, a suggested content stack data container comprising one or more references to one or more related content items and a corresponding additional dynamic stack object; and providing, for display on the client device and within a stack library, a reference to the suggested content stack data container.

10. The computer-implemented method of claim 1, further comprising:

determining an expiry condition for the content stack data container; and archiving the content stack data container based on determining that the expiry condition has been met.

11. A system comprising:

at least one processor; and a non-transitory computer readable medium comprising instructions that, when executed by the at least one processor, cause the system to:

receive, from a client device, a stack generation request indicating a content item from a cloud storage database to include in a content stack;

generate, in response to the stack generation request, a content stack data container comprising references to a subset of relevant content items from the cloud storage database, the references to the subset of relevant content items comprising a reference to the content item;

generate, using a large language model to process the subset of relevant content items from the cloud storage database, a dynamic stack object to include within the content stack data container;

add the dynamic stack object to the content stack data container;

provide, for display on the client device, a stack canvas comprising the dynamic stack object, a visual representation of the content item from the cloud storage database, and a stack-level chat box;

receive, from the client device and via the stack-level chat box, a user query related to the subset of relevant content items within the content stack data container;

generate a query response by using the large language model to process (i) the user query and (ii) a limited number of content items comprising the subset of relevant content items in the content stack data container; and provide, for display within the stack canvas, the query response.

12. The system of claim 11, further comprising instructions that, when executed by the at least one processor, cause the system to:

provide, for display within the stack canvas, a global chat box;

receive, from the client device and via the global chat box, a user query related to content within the cloud storage database; and generate a second query response by using the large language model to process (i) the user query related to content within the cloud storage database and (ii) content within the cloud storage database.

13. The system of claim 11, further comprising instructions that, when executed by the at least one processor, cause the system to:

detect a modification to the content stack;

generate, based on the modification to the content stack and using the large language model, an updated dynamic stack object to include within the content stack data container; and provide, for display on the client device, the stack canvas depicting the updated dynamic stack object.

14. The system of claim 13, further comprising instructions that, when executed by the at least one processor, cause the system to:

generate a notification indicating the modification to the content stack; and include, within the stack canvas corresponding to the content stack data container, the notification indicating the modification to the content stack.

15. The system of claim 11, further comprising instructions that, when executed by the at least one processor, cause the system to:

receive, from the client device and via the stack canvas, a selection of content items from the subset of relevant content items;

receive, from the client device and via the stack-level chat box, a second user query related to the selected content items;

generate a second query response using the large language model to process (i) the second user query and (ii) the selected content items; and provide, for display within the stack canvas, the second query response.

16. A non-transitory computer readable medium comprising instructions that, when executed by at least one processor, cause the at least one processor to:

receive, from a client device, a stack generation request indicating a content item from a cloud storage database to include in a content stack;

generate, in response to the stack generation request, a content stack data container comprising references to a subset of relevant content items from the cloud storage database, the references to the subset of relevant content items comprising a reference to the content item;

generate, using a large language model to process the subset of relevant content items from the cloud storage database, a dynamic stack object to include within the content stack data container;

add the dynamic stack object to the content stack data container;

provide, for display on the client device, a stack canvas comprising the dynamic stack object, a visual representation of the content item from the cloud storage database, and a stack-level chat box;

receive, from the client device and via the stack-level chat box, a user query related to the subset of relevant content items within the content stack data container;

generate a query response by using the large language model to process (i) the user query and (ii) a limited number of content items comprising the subset of relevant content items in the content stack data container; and provide, for display within the stack canvas, the query response.

17. The non-transitory computer readable medium of claim 16, further comprising instructions that, when executed by the at least one processor, cause the at least one processor to receive the stack generation request by:

generating, using the large language model to process content items from the cloud storage database, a suggested content stack comprising one or more related content items, wherein the one or more related content items comprise the content item;

providing, for display via the client device, the suggested content stack; and receiving, from the client device, a suggested stack generation request.

18. The non-transitory computer readable medium of claim 16, further comprising instructions that, when executed by the at least one processor, cause the at least one processor to:

determine an expiry condition for the content stack data container; and archive the content stack data container based on determining that the expiry condition has been met.

19. The non-transitory computer readable medium of claim 16, further comprising instructions that, when executed by the at least one processor, cause the at least one processor to:

receive, from the client device associated with a user account, a request to associate an additional user account with the content stack data container; and provide, for display on an additional client device associated with the additional user account, the stack canvas.

20. The non-transitory computer readable medium of claim 16, further comprising instructions that, when executed by the at least one processor, cause the at least one processor to:

detect a modification to one or more content items of the subset of relevant content items in the content stack;

generate, based on the modification to the one or more content items and using the large language model, an updated dynamic stack object to include within the content stack data container; and provide, for display on the client device, the stack canvas depicting the updated dynamic stack object.

* * * * *